(12) United States Patent
Yokota et al.

(10) Patent No.: US 8,817,220 B2
(45) Date of Patent: Aug. 26, 2014

(54) LIQUID CRYSTAL DEVICE AND PROJECTION-TYPE DISPLAY DEVICE

(75) Inventors: Tomoki Yokota, Chino (JP); Hiroyuki Hara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 235 days.

(21) Appl. No.: 13/429,514

(22) Filed: Mar. 26, 2012

(65) Prior Publication Data

US 2012/0249896 A1 Oct. 4, 2012

(30) Foreign Application Priority Data

Mar. 29, 2011 (JP) ................. 2011-073575

(51) Int. Cl.
*G02F 1/1345* (2006.01)
*G02F 1/1343* (2006.01)
*G02F 1/1335* (2006.01)

(52) U.S. Cl.
USPC ............... 349/152; 349/5; 349/151; 349/149; 349/139

(58) Field of Classification Search
CPC .............. G02F 1/1345; G02F 2001/133388; G02F 1/13454; G02F 1/13452; G02F 1/13458; G02F 2001/13337; G09G 3/3648; G09G 2300/0426; G09G 2320/0219
USPC ............. 349/5, 139, 143, 149, 151, 123, 152; 345/87
See application file for complete search history.

(56) References Cited

U.S. PATENT DOCUMENTS

| | | | | |
|---|---|---|---|---|
| 6,441,876 B1* | 8/2002 | Wada et al. | ................. | 349/111 |
| 6,803,976 B1* | 10/2004 | Fujioka et al. | ................. | 349/54 |
| 6,933,671 B2* | 8/2005 | Nakanishi | ................. | 313/500 |
| 7,808,587 B2* | 10/2010 | Shirasaka et al. | ............ | 349/111 |
| 2004/0174183 A1* | 9/2004 | Nojiri et al. | .................. | 324/770 |
| 2007/0040983 A1* | 2/2007 | Ishii | ............................. | 349/152 |
| 2008/0055529 A1* | 3/2008 | Shirasaka et al. | ............ | 349/143 |
| 2008/0158453 A1* | 7/2008 | Segawa et al. | ................. | 349/34 |
| 2010/0173433 A1* | 7/2010 | Park et al. | ....................... | 438/27 |
| 2010/0225632 A1* | 9/2010 | Ma et al. | ....................... | 345/211 |
| 2011/0194062 A1* | 8/2011 | Lee | .............................. | 349/149 |
| 2011/0242078 A1* | 10/2011 | Takahashi et al. | ............ | 345/211 |

FOREIGN PATENT DOCUMENTS

| | | |
|---|---|---|
| JP | 4-125617 A | 4/1992 |
| JP | 6-289408 A | 10/1994 |
| JP | 2008-58497 A | 3/2008 |
| JP | 2009-92697 A | 4/2009 |

* cited by examiner

*Primary Examiner* — Michael Caley
*Assistant Examiner* — Jia Pan
(74) *Attorney, Agent, or Firm* — ALG Intellectual Property, LLC

(57) ABSTRACT

In an element substrate of a liquid crystal device, a peripheral electrode to which a potential different from a common potential applied to a dummy pixel electrode and the like is applied is formed in a region interposed between an image display region and a sealing material. An electrical supply line that supplies the potential from the side to the peripheral electrode runs through the outside from a scanning line driving circuit portion.

10 Claims, 10 Drawing Sheets

LIQUID CRYSTAL DEVICE AND PROJECTION-TYPE DISPLAY DEVICE

BACKGROUND

1. Technical Field

The present invention relates to a liquid crystal device in which a liquid crystal is held between a pair of substrates, and a projection-type display device which uses the liquid crystal device as a light valve.

2. Related Art

In a liquid crystal device, an element substrate provided with an image display region in which a plurality of pixel electrodes are arranged, at one surface side, and an opposing substrate provided with a common electrode to which a common potential is applied are bonded by a sealing material, and a liquid crystal layer is held within a region surrounded by the sealing material between the element substrate and the opposing substrate. In such a liquid crystal device, when ionic impurities eluted from ionic impurities or sealing materials mixed at the time of liquid crystal injection are agglomerated within an image display region by driving of the liquid crystal device, deterioration of the display quality such as burn-in (spot) of an image is caused. Consequently, a technique is proposed which prevents ionic impurities from being agglomerated within the image display region by providing a peripheral electrode in the outside of the image display region, and attracting and retaining ionic impurities in the peripheral electrode (see JP-A-2008-58497).

Specifically, in FIG. 4 and the like of the technique of JP-A-2008-58497, a first peripheral electrode and a second peripheral electrode are provided so as to surround the periphery of the image display region between the image display region and a horizontal transfer circuit (driving circuit portion), and between the image display region and a vertical transfer circuit (driving circuit portion). Therefore, when different potentials are applied to the first peripheral electrode and the second peripheral electrode, and the polarities of the potentials applied to the first peripheral electrode and the second peripheral electrode are reversed for each frame, a horizontal electric field is generated between the first peripheral electrode and the second peripheral electrode, and thus ionic impurities are attracted into the first peripheral electrode and the second peripheral electrode, and are retained therein.

However, when the peripheral electrodes (first peripheral electrode and second peripheral electrode) are extended along the sealing material, a trapping electrical supply line that supplies a potential for ionic impurity trapping to the peripheral electrodes intersects a signal line provided in the driving circuit portions (horizontal transfer circuit and vertical transfer circuit), or a signal line extending toward the driving circuit portions. For this reason, there is a problem that when an alternating current is applied to the peripheral electrodes, the waveform distortion and the like are generated in a signal flowing through the signal line and the display quality is deteriorated due to capacitive coupling between the signal lines provided in the driving circuit portions, or the signal lines extending toward the driving circuit portions.

SUMMARY

An advantage of some aspects of the invention is that it provides a liquid crystal device and a projection-type display device including the liquid crystal device which are capable of preventing the influence of a potential for ionic impurity trapping on a signal used in the driving circuit portion even when an element substrate is provided with an electrical supply line for ionic impurity trapping and a peripheral electrode.

According to an aspect to the invention, there is provided a liquid crystal device including: an element substrate, provided with an image display region in which a plurality of pixel electrodes are arranged, at one surface side, which has a first side, a second side intersecting the first side, and a third side opposed to the first side and intersecting the second side; an opposing substrate provided with a common electrode to which a common potential is applied; a sealing material that bonds the element substrate to the opposing substrate; and a liquid crystal layer which is held within a region surrounded by the sealing material between the element substrate and the opposing substrate, wherein the one surface side of the element substrate is provided with a first driving circuit portion provided between the image display region and the first side, a plurality of terminals, provided between the first driving circuit portion and the first side, which are provided along the first side, a second driving circuit portion provided between the image display region and the second side, a trapping electrical supply line, extending from the first side toward the third side between the second driving circuit portion and the second side, which supplies a potential for ionic impurity trapping different from the common potential, and a peripheral electrode that electrically conducts to the electrical supply line in a peripheral region interposed between the image display region and the sealing material.

In the aspect of the invention, the element substrate is provided with the peripheral electrode extending along the sealing material in the peripheral region, and a potential for ionic impurity trapping different from a common potential is applied to the peripheral electrode. For this reason, an electric field in the thickness direction of the liquid crystal layer is generated between the peripheral electrode and the common electrode. Therefore, when an ionic impurity mixed at the time of the liquid crystal injection or an ionic impurity eluted from the sealing material exists in the liquid crystal layer and such an ionic impurity is agglomerated in the end of the image display region with liquid crystal driving, the ionic impurity is attracted to the portion which is opposed to the peripheral electrode in the peripheral region or the peripheral electrode in the common electrode, and the attracted ionic impurity is retained in the peripheral region at the state where it is agglomerated therein. Here, in the aspect of the invention, the element substrate is provided with the first driving circuit portion and terminal between the end of the image display region and the first side of the element substrate, and is provided with the second driving circuit portion between the end of the image display region and the second side of the element substrate. However, in the aspect of the invention, the trapping electrical supply line that supplies the potential for ionic impurity trapping from the first side of the element substrate to the peripheral electrode extends through the outside from the second driving circuit portion toward the third side of the element substrate. For this reason, the trapping electrical supply line extends without intersecting the signal line provided in the first driving circuit portion, the signal line extending toward the first driving circuit portion, the signal line provided in the second driving circuit portion, and the signal line extending toward the second driving circuit portion. For this reason, when an alternating current is applied to the trapping electrical supply line, coupling is scarcely generated between the trapping electrical supply line and the signal line, and thus there is no influence on the signal used in the driving circuit portion. Therefore, it is possible to prevent the display quality from being deteriorated due to the potential for ionic impurity trapping.

In the aspect of the invention, as the trapping electrical supply line, it is possible to adopt both the configuration in which it extends from the first driving circuit portion and the configuration in which it extends from the terminal. In the aspect of the invention, in the latter case, it is preferable that the trapping electrical supply line electrically conducts to a trapping electrical supply terminal of the plurality of terminals to which the potential of ionic impurity trapping is supplied.

In this case, it is preferable that in the plurality of terminals, an inter-terminal distance between the trapping electrical supply terminal and a signal terminal adjacent to the trapping electrical supply terminal is larger than other inter-terminal distances in the plurality of terminals. According to such a configuration, a gap between the trapping electrical supply line and the signal line is wide. Therefore, when an alternating current is applied to the trapping electrical supply line, coupling is not generated between the trapping electrical supply line and the signal line, and thus there is no influence on the signal used in the driving circuit portion.

In addition, it is preferable that in the plurality of terminals, the terminal adjacent to the trapping electrical supply terminal is a constant potential terminal. According to such a configuration, when an alternating current is applied to the trapping electrical supply line, coupling is not generated between the trapping electrical supply line and the signal line, and thus there is no influence on the signal used in the driving circuit portion.

In the aspect to the invention, it is preferable that an insulating interlayer is provided at a side of the trapping electrical supply line in which the opposing substrate is located, the peripheral electrode is provided at a side of the insulating interlayer in which the opposing substrate is located, and in the peripheral electrode, a width dimension of a conductive portion to the trapping electrical supply line through a contact hole formed in the insulating interlayer is larger than width dimensions of other portions in the peripheral electrode. According to such a configuration, it is possible to reliably allow electrical conduction between the trapping electrical supply line and the peripheral electrode.

In the aspect to the invention, it is preferable that the peripheral electrode extends along the sealing material between the image display region and the first driving circuit portion, and between the image display region and the second driving circuit portion. According to such a configuration, it is possible to efficiently attract the ionic impurity to the peripheral electrode, and to retain the ionic impurity therein.

A liquid crystal device according to another aspect of the invention is used as, for example, a light valve of a projection-type display device or a direct-view-type display device. When the liquid crystal device according to the aspect of the invention is used in the projection-type display device, the projection-type display device is provided with a light source portion that emits light supplied to the liquid crystal device, and a projection-type optical system that projects light modulated by the liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
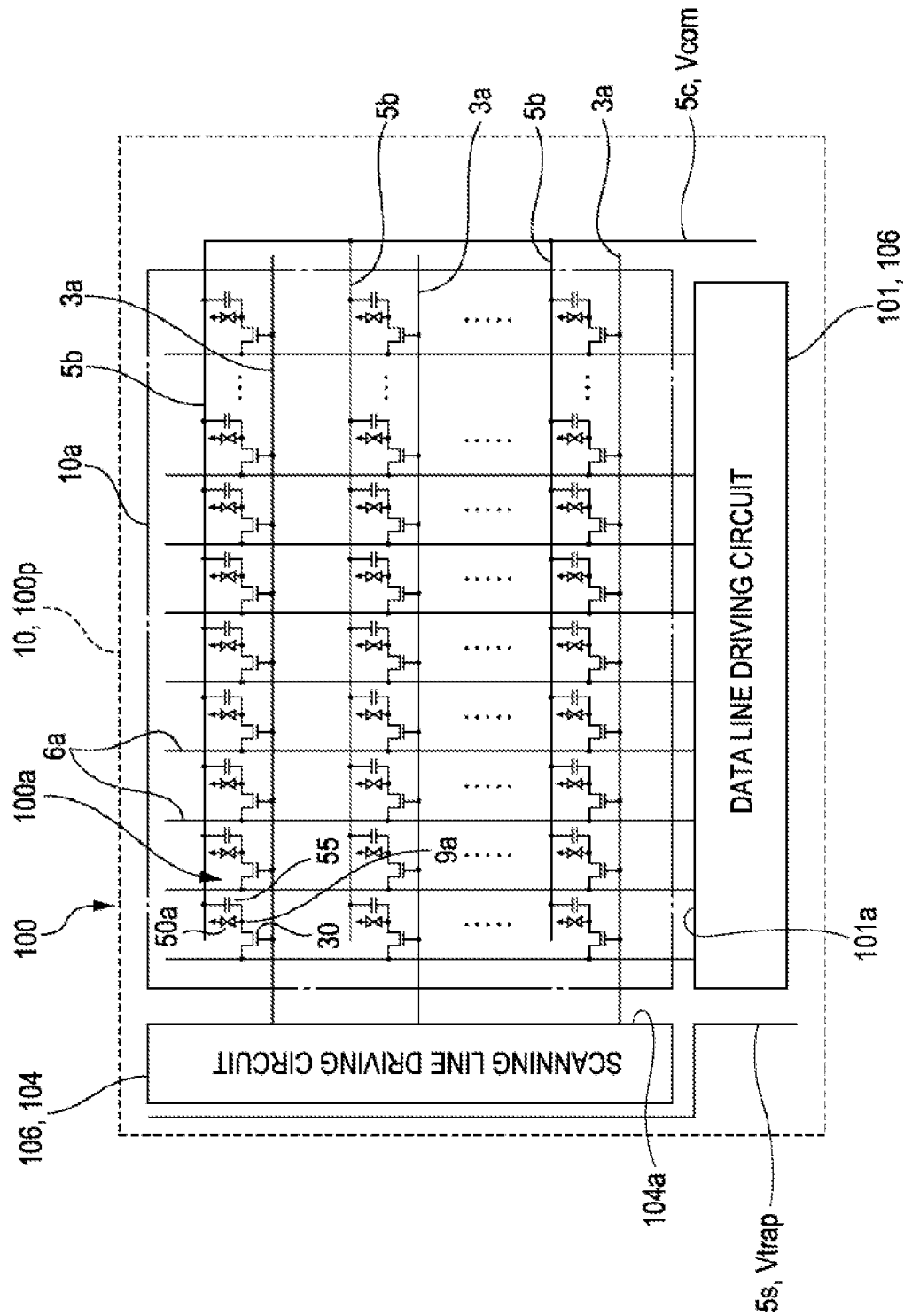
FIG. 1 is a block diagram illustrating an electrical configuration of a liquid crystal device to which the invention is applied.

Embodiments of the invention will be described with reference to the drawings. Meanwhile, in the drawings referenced in the following description, each layer or each member is set to a size capable of being recognized in the drawings, and thus reduced scales are different for each layer or each member. Meanwhile, when the direction of a current flowing through a field-effect transistor is reversed, a source and a drain switch to each other. However, in the following description, for convenience of description, the side to which a pixel electrode is connected is set to a drain, and the side to which a data line is connected is set to a source. In addition, when layers formed on an element substrate are described, the upper layer side or the surface side means the side opposite to the side on which a substrate main body of the element substrate is located (the side on which an opposing substrate is located), and the lower layer side means the side on which the substrate main body of the element substrate is located (the side opposite to the side on which the opposing substrate is located).

Embodiment 1

Entirety of Configuration

FIG. 1 is a block diagram illustrating an electrical configuration of a liquid crystal device to which the invention is applied. Meanwhile, FIG. 1 is a block diagram illustrating an electrical configuration persistently, and does not show an interconnection, the shape of an electrode, the extending direction, the layout, and the like.

In FIG. 1, a liquid crystal device 100 includes a liquid crystal panel 100*p* of TN (Twisted Nematic) mode or VA (Vertical Alignment) mode, and the liquid crystal panel 100*p* includes an image display region 10*a* in which a plurality of pixels 100*a* is arranged in a matrix at the central region thereof. In an element substrate 10 (see FIGS. 2A and 2B, etc.) described later of the liquid crystal panel 100*p*, a plurality of data lines 6*a* and a plurality of scanning lines 3*a* extend in a matrix in the inside of the image display region 10*a*, and pixels 100*a* are formed at positions corresponding to the intersections thereof. A pixel transistor 30 composed of a field-effect transistor, and a pixel electrode 9*a* described later are formed in each of a plurality of pixels 100*a*. A data line 6*a* is electrically connected to a source of the pixel transistor 30, a scanning line 3*a* is electrically connected to a gate of the pixel transistor 30, and a pixel electrode 9*a* is electrically connected to a drain of the pixel transistor 30.

In the element substrate 10, a peripheral circuit portion 106 including a scanning line driving circuit portion 104, a data line driving circuit portion 101 and various types of interconnections are provided at the outer periphery side from the image display region 10*a*. In the data line driving circuit portion 101, a plurality of data lines 6*a* extend from an inner end 101*a* located at the image display region 10*a* side to the image display region 10*a*, and the data line driving circuit portion 101 sequentially supplies a data signal to each of the data line 6*a*. In the scanning line driving circuit portion 104, a plurality of scanning lines 3*a* extends from an inner end 104*a* located at the image display region 10*a* side to the image display region 10, and the scanning line driving circuit portion 104 sequentially supplies a scanning signal to each of the scanning lines 3*a*.

In each of the pixels 100*a*, the pixel electrode 9*a* is opposed to a common electrode formed in an opposing substrate 20 (see FIGS. 2A and 2B, etc.) described later with a liquid crystal layer interposed therebetween, and is composed of a liquid crystal capacitance 50*a*. In addition, in order to prevent the fluctuation in the image signal held by the liquid crystal capacitance 50*a*, a storage capacitance 55 is added to each of the pixels 100*a* in parallel with the liquid crystal capacitance 50*a*. In the embodiment, in order to form the storage capacitance 55, a capacitive line 5*b* is formed extending across a plurality of pixels 100*a* in parallel with the scanning line 3*a*.

In such a liquid crystal device 100, a common potential line 5*c* to which a common potential Vcom is applied, and a trapping electrical supply line 5*s* for supplying a potential Vtrap for ionic impurity trapping different from the common potential Vcom are provided in formation regions of the scanning line driving circuit portion 104 and the data line driving circuit portion 101 and the vicinities thereof, the storage capacitance 55 is electrically connected to the common potential line 5*c*, and a peripheral electrode described later is electrically connected to the trapping electrical supply line 5*s*.

Configuration of Liquid Crystal Panel 100*p* and Element Substrate 10

Figure 2A:
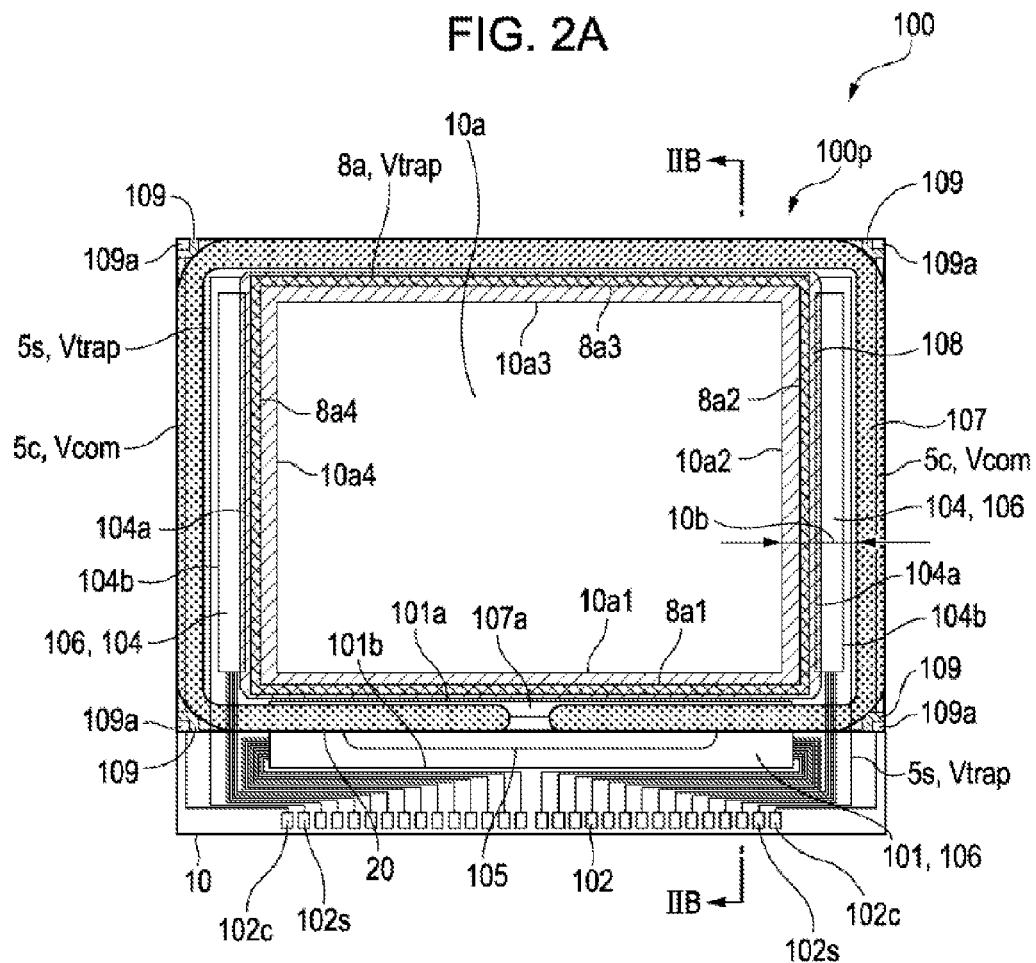
FIGS. 2A and 2B are explanatory diagrams illustrating a liquid crystal panel of the liquid crystal device according to Embodiment 1 of the invention.
Figure 2B:
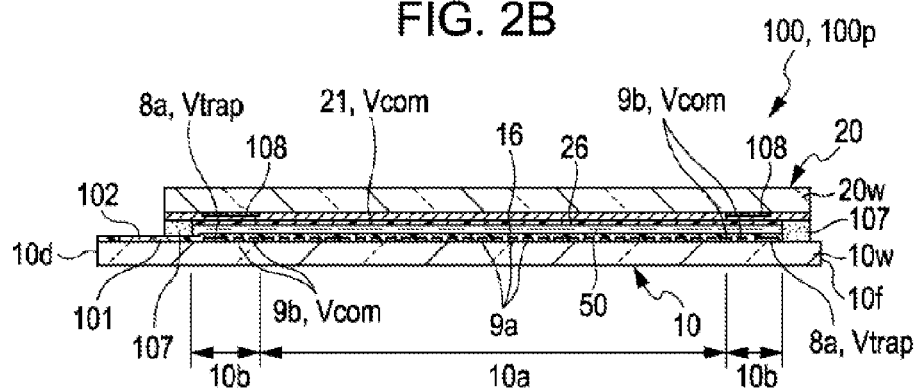
Figure 3A:
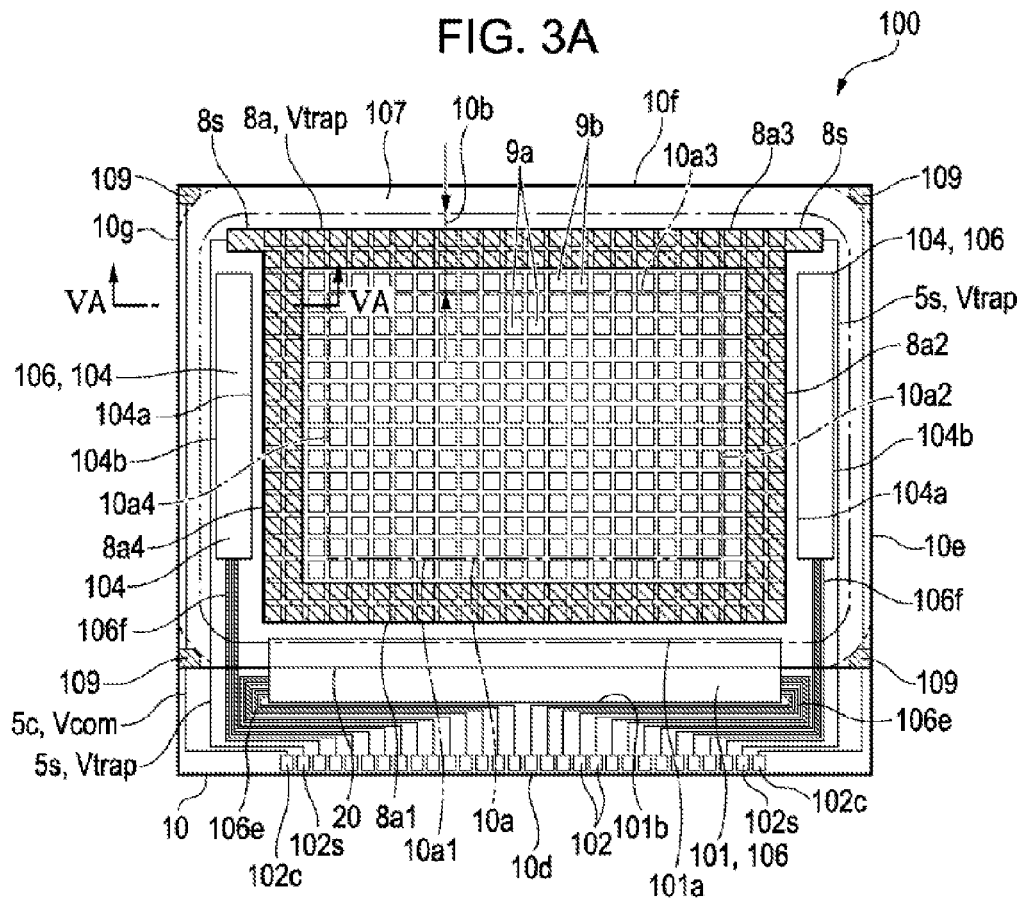
FIGS. 3A and 3B are explanatory diagrams illustrating an electrode and the like formed in an element substrate of the liquid crystal device according to Embodiment 1 of the invention.
Figure 3B:
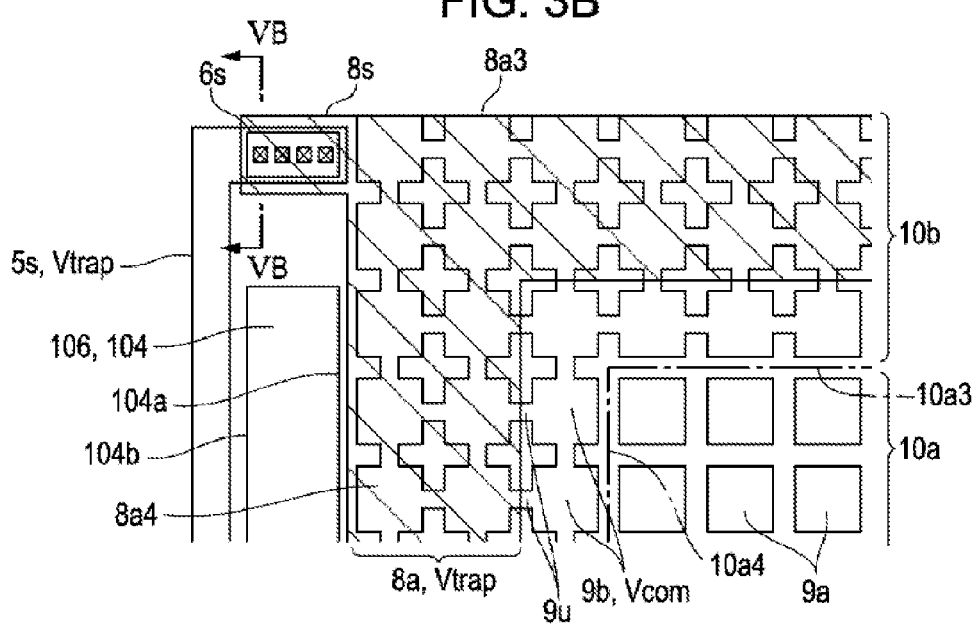

FIGS. 2A and 2B are explanatory diagrams illustrating the liquid crystal panel 100*p* of the liquid crystal device 100 according to Embodiment 1 of the invention. FIGS. 2A and 2B are a plan view when the liquid crystal panel 100*p* of the liquid crystal device 100 to which the invention is applied, together with each component, is seen from the opposing substrate side, and a cross-sectional view taken along the line IIB-IIB, respectively. FIGS. 3A and 3B are explanatory diagrams illustrating an electrode and the like formed in the element substrate 10 of the liquid crystal device 100 according to Embodiment 1 of the invention. FIGS. 3A and 3B are an explanatory diagram illustrating a planar layout of the pixel electrode 9*a* and the like in the entire element substrate 10, and an explanatory diagram illustrating a planar layout of a dummy pixel electrode 9*b* and the like in a peripheral region 10*b*, respectively. Meanwhile, in FIGS. 3A and 3B, the numbers of pixel electrodes 9*a* and dummy pixel electrodes 9*b*, and the like are shown smaller than the originals.

As shown in FIGS. 2A, 2B, and 3A, in the liquid crystal panel 100*p*, the element substrate 10 and the opposing substrate 20 are bonded to each other by a sealing material 107 through a predetermined gap, and the sealing material 107 is provided in a frame shape so as to be along the outer edge of the opposing substrate 20. The sealing material 107 is an adhesive made of a photo-curable resin, a thermosetting resin, or the like, and a gap material, such as a glass fiber or a glass bead, for setting the distance between both substrates to a predetermined value is mixed therewith.

In the embodiment, a discontinuous portion 107*a* used as a liquid crystal injection port is provided in the sealing material 107, and such a discontinuous portion 107*a* is used as an injection port when a liquid crystal material is decompressively injected, and is sealed by a sealing material 105 made of a photo-curable resin, a thermosetting resin or the like after the liquid crystal material is injected. In the embodiment, the discontinuous portion 107*a* and the sealing material 105 are provided at the side at which the side 10*d* (first side) is located among four sides 10*d* to 10*g* of the element substrate 10. In the embodiment, as the sealing material 107 and the sealing material 105, an acrylic or epoxy photo-curable resin is used.

In the liquid crystal panel 100*p* having such a configuration, the element substrate 10 and the opposing substrate 20 are all quadrangular, and the image display region 10*a* described with reference to FIG. 1 is provided at the approximate center of the liquid crystal panel 100*p* as a quadrangular region. The sealing material 107 is also provided in an approximately quadrangular shape corresponding to such a shape, and an approximately quadrangular peripheral region 10*b* is provided in a frame shape between the inner circumferential edge of the sealing material 107 and the outer circumferential edge of the image display region 10*a*.

In one surface 10*s* side (side at which the opposing substrate 20 is located) of one surface 10*s* and the other surface 10*t* of the element substrate 10, the data line driving circuit portion 101 and a plurality of terminals 102 are formed along one side (side 10*d*/first side) of the element substrate 10 in a region from the outside of the image display region 10*a*, and the scanning line driving circuit portion 104 is formed along the other side (side 10*e* or 10*g*/second side) intersecting the one side. Therefore, the data line driving circuit portion 101 is formed along the end 10*a*1 out of four ends 10*a*1 to 10*a*4 of the image display region 10*a*, and the scanning line driving circuit portion 104 is formed along two ends 10*a*2 and 10*a*4 intersecting the end 10*a*1. In addition, on the side opposite to the side where the image display region 10*a* is located with respect to the data line driving circuit portion 101, a plurality of terminals 102 are provided along the side 10*d*, and a plurality of terminals 102 are provided between the side 10*d* and the outside end 101*b* of the data line driving circuit portion 101. A signal line 106*e* and the like extend from such a plurality of terminals 102 toward the data line driving circuit portion 101, and a signal line 106*f* and the like extend therefrom toward the scanning line driving circuit portion 104.

In addition, although described later for details, in one surface 10*s* of the element substrate 10, the pixel transistor 30 described with reference to FIG. 1 and the rectangular pixel electrode 9*a* electrically connected to the pixel transistor 30 are formed in a matrix in the image display region 10*a*, and an orientation film 16 described later is formed on the upper layer side of the pixel electrode 9*a*.

In one surface 10*s* of the element substrate 10, the dummy pixel electrode 9*b* formed simultaneously with the pixel electrode 9a is formed in the peripheral region 10b. Therefore, the orientation film 16 is formed on the upper layer side of the pixel electrode 9a and the dummy pixel electrode 9b. For the dummy pixel electrode 9b, the configuration in which a potential is applied or the configuration in a floating state in which a potential is not applied is adopted. In any of these cases, when the surface in which the orientation film 16 is formed in the element substrate 10 is planarized by polishing, the dummy pixel electrode 9b contributes to compression of the height position between the image display region 10a and the peripheral region 10b and planarization of the surface in which the orientation film 16 is formed. In addition, in the embodiment, since the common potential Vcom is applied to the dummy pixel electrode 9b, it is possible to prevent the disorder of orientation of liquid crystal molecules in the outer peripheral end of the image display region 10a.

In the embodiment, as shown in FIG. 3B, the dummy pixel electrode 9b has the same shape and size as those of the pixel electrode 9a and is formed at the same pitch as that of the pixel electrode 9a. Here, among a plurality of dummy pixel electrodes 9b, the adjacent dummy pixel electrodes 9b are connected to each other through a connecting portion 9u having a width narrower than that of the dummy pixel electrode 9b. Therefore, when the common potential Vcom is applied to a portion of the dummy pixel electrodes 9b, the common potential Vcom is applied to all the dummy pixel electrodes 9b.

In addition, although a peripheral electrode 8a for ionic impurity trapping or the trapping electrical supply line 5s is formed in the element substrate 10, the configuration of the peripheral electrode 8a or the trapping electrical supply line 5s will be described later.

In FIG. 2B, again, a common electrode 21 is formed in one surface, which is opposed to the element substrate 10, of both surfaces of the opposing substrate 20, and an orientation film 26 described later is formed in an upper layer of the common electrode 21. The common electrode 21 is formed over substantially the entire surface of the opposing substrate 20 or across a plurality of pixels 100a as a plurality of strip electrodes. In addition, in one substrate surface which is opposed to the element substrate 10 in the opposing substrate 20, a light-shielding layer 108 is formed at the lower layer side of the common electrode 21. In the embodiment, the light-shielding layer 108 is formed in a frame shape extending along the outer circumferential edge of the image display region 10a. Here, the outer circumferential edge of the light-shielding layer 108 is located with a gap from the inner circumferential edge of the sealing material 107, and the light-shielding layer 108 and the sealing material 107 do not overlap each other. Meanwhile, in the opposing substrate 20, the light-shielding layer 108 may be formed, as a black matrix portion, in a region and the like overlapping the region interposed between the adjacent pixel electrodes 9a.

In the liquid crystal panel 100p having such a configuration, an inter-substrate conducting electrode 109 for making electrical conduction between the element substrate 10 and the opposing substrate 20 is formed in a region overlapping the angular portion of the opposing substrate 20 at the outside from the sealing material 107, in the element substrate 10. The inter-substrate conducting electrode 109 is electrically connected to the common potential line 5c, and the common potential line 5c is electrically conducted to a common potential terminal 102c of a plurality of terminals 102. In the embodiment, the common potential terminal 102c is a terminal located at the endmost portion of a plurality of terminals 102.

Here, an inter-substrate conducting material 109a including conductive particles such as a so-called silver point is disposed at the position overlapping the inter-substrate conducting electrode 109, and the common potential line 5c of the element substrate 10 and the common electrode 21 of the opposing substrate 20 are electrically connected to each other through the inter-substrate conducting material 109a. For this reason, the common potential Vcom is applied to the common electrode 21 from the element substrate 10 side. Meanwhile, the sealing material 107 is provided along the outer circumferential edge of the opposing substrate 20 with substantially the same width dimensions. For this reason, the sealing material 107 is provided so as to pass through the inside while bypassing the inter-substrate conducting electrode 109 in the region overlapping the angular portion of the opposing substrate 20, and the angular portion of the sealing material 107 has a substantially arc-like shape.

In the liquid crystal device 100 having such a configuration, when the pixel electrode 9a and the common electrode 21 is formed by a light-transmitting conductive film such as an ITO (Indium Tin Oxide) film or an IZO (Indium Zinc Oxide) film, a transmissive liquid crystal device can be formed. On the other hand, when one of the pixel electrode 9a and the common electrode 21 is formed by a light-transmitting conductive film and the other is formed by a reflective conductive film such as an aluminum film, a reflective liquid crystal device can be formed. When the liquid crystal device 100 is a reflection type, light incident from one substrate of the element substrate 10 and the opposing substrate 20 is modulated while the light is reflected from the other substrate and is emitted, and the image is displayed. When the liquid crystal device 100 is a transmission type, light incident from one substrate of the element substrate 10 and the opposing substrate 20 is modulated while the light passes through the other substrate and is emitted, the image is displayed.

When the liquid crystal device 100 can be used as a color display device of an electronic device such as a mobile computer and a cellular phone, in this case, a color filter (not shown) or a protective film is formed in the opposing substrate 20. In addition, in the liquid crystal device 100, a polarizing film, a phase difference film, a polarizing plate, and the like are disposed in a predetermined direction to the liquid crystal panel 100p, in accordance with the type of a liquid crystal layer 50 and normally white mode/normally black mode. Further, the liquid crystal device 100 can be used as a light valve for RGB in a projection-type display device (liquid crystal projector) described later. In this case, since light of each color resolved through a dichroic mirror for RGB color separation is incident on each of the liquid crystal devices 100 for RGB as projected light, a color filter is not formed.

In the embodiment, the liquid crystal device 100 is a transmissive liquid crystal device used as a light valve for RGB in the projection-type display device described later, and a description will be made with an emphasis on a case where light incident from the opposing substrate 20 passes through the element substrate 10 and is emitted. In addition, in the embodiment, a description will be made with an emphasis on a case where the liquid crystal device 100 includes the liquid crystal panel 100p of VA mode in which a nematic liquid crystal compound having a negative dielectric anisotropy (dielectric constant anisotropy) is used as the liquid crystal layer 50.

Specific Configuration of Pixel

Figure 4A:
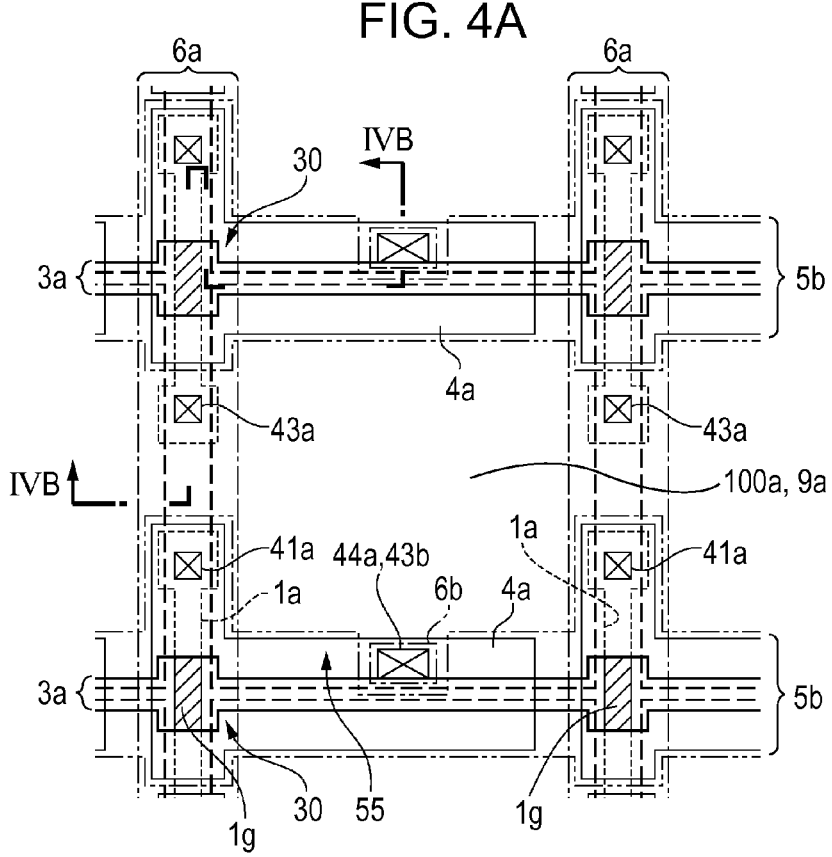
FIGS. 4A and 4B are explanatory diagrams illustrating pixels of the liquid crystal device according to Embodiment 1 of the invention.
Figure 4B:
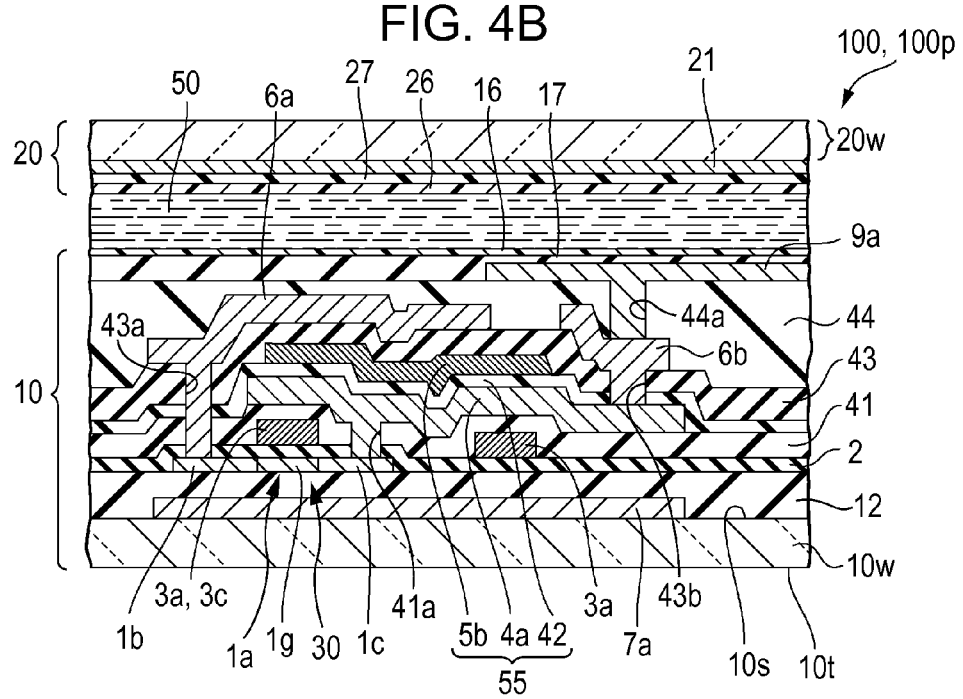

FIGS. 4A and 4B are explanatory diagrams illustrating pixels of the liquid crystal device 100 according to Embodiment 1 of the invention. FIGS. 4A and 4B are a plan view illustrating adjacent pixels in the element substrate 10 used in the liquid crystal device 100 to which the invention is applied, and a cross-sectional view when the liquid crystal device 100 is cut off at a position equivalent to the line IVB-IVB of FIG. 4A, respectively. Meanwhile, in FIG. 4A, a semiconductor layer is shown by the thin and short dotted line, the scanning line 3a is shown by the thick and solid line, the data line 6a and a thin film formed simultaneously therewith are shown by the dashed-dotted line, the capacitive line 5b is shown by the dashed-two dotted line, the pixel electrode 9a is shown by the thick and long dotted line, and a drain electrode 4a is shown by the thin solid line. Meanwhile, a light-shielding layer 7a is formed in a region overlapping the scanning line 3a, the capacitive line 5b or the like, but the light-shielding layer 7a is not shown in FIG. 4A.

As shown in FIG. 4A, in one surface 10s side of the element substrate 10, the quadrangular pixel electrode 9a is formed in each of a plurality of pixels 100a, and the data line 6a and the scanning line 3a are formed along the horizontal and vertical boundary of each pixel electrode 9a. The data line 6a and the scanning line 3a linearly extend respectively, and the pixel transistor 30 is formed corresponding to the intersection between the data line 6a and the scanning line 3a. The capacitive line 5b is formed on the element substrate 10 so as to overlap the scanning line 3a. In the embodiment, the capacitive line 5b includes a main line portion linearly extended so as to overlap the scanning line 3a, and a sub line portion extended so as to overlap the data line 6a at the intersection portion between the data line 6a and the scanning line 3a.

As shown in FIGS. 4A and 4B, the element substrate 10 mainly includes the pixel electrode 9a, the pixel transistor 30 for pixel switching, and the orientation film 16 which are formed at one surface 10s side of a light-transmitting substrate main body 10w such as a quartz substrate or a glass substrate. The opposing substrate 20 mainly includes the common electrode 21 and the orientation film 26 which are formed at one surface side of a light-transmitting substrate main body 20w such as a quartz substrate or a glass substrate.

In the element substrate 10, the light-shielding layer 7a made of a metal silicide film or a metal film is formed at one surface 10s side of the substrate main body 10w, and an underlying insulating film 12 is formed at the surface side of the light-shielding layer 7a. In addition, the pixel transistor 30 including a semiconductor layer 1a is formed in each of a plurality of pixels 100a. The semiconductor layer 1a includes a channel region 1g, a source region 1b, and a drain region 1c which are opposed to a gate electrode 3c composed of a portion of the scanning line 3a with a gate insulating layer 2 interposed therebetween, and the source region 1b and the drain region 1c include a low-concentration region and a high-concentration region, respectively. The semiconductor layer 1a is composed of, for example, a polycrystalline silicon film and the like formed on the surface of the underlying insulating film 12, and the gate insulating layer 2 is composed of a silicon oxide film or a silicon nitride film formed by a CVD method and the like. In addition, the gate insulating layer 2 may have a two-layer structure of a silicon oxide film obtained by thermally oxidizing the semiconductor layer 1a, and a silicon oxide film or a silicon nitride film formed by a CVD method and the like. A conductive polysilicon film, a metal silicide film, or a metal film is used in the scanning line 3a. Meanwhile, in the embodiment, the light-shielding layer 7a is provided in the region overlapping the pixel transistor 30 so that when light after passing through the liquid crystal device 100 is reflected from another member, it is possible to prevent a malfunction caused by a photocurrent from occurring in the pixel transistor 30 due to the incidence of such reflected light on the semiconductor layer 1a. However, a structure may be adopted in which the light-shielding layer 7a is formed as a scanning line, and the gate electrode 3c and the light-shielding layer 7a are electrically connected to each other through a contact hole.

A first insulating interlayer 41 made of a silicon oxide film or the like is formed on the upper layer side of the scanning line 3a, and the drain electrode 4a is formed on the upper layer of the first insulating interlayer 41. The drain electrode 4a is formed in an approximately L shape extending along the scanning line 3a and the data line 6a from the position where the scanning line 3a and the data line 6a intersect each other. The drain electrode 4a is made of a conductive polysilicon film, a metal silicide film, a metal film, or the like, and is electrically connected to the drain region 1c through a contact hole 41a.

A dielectric layer 42 made of a silicon nitride film, a silicon oxide film or the like is formed on the upper layer side of the drain electrode 4a. The capacitive line 5b is formed on the upper layer side of the dielectric layer 42 so as to be opposed to the drain electrode 4a with the dielectric layer 42 interposed therebetween, and the storage capacitance 55 is formed by the capacitive line 5b, the dielectric layer 42 and the drain electrode 4a. The capacitive line 5b is made of a conductive polysilicon film, a metal silicide film, a metal film or the like.

A second insulating interlayer 43 made of a silicon oxide film or the like is formed on the upper layer side of the capacitive line 5b, and the data line 6a and a relay electrode 6b are formed on the upper layer of the second insulating interlayer 43. The data line 6a is electrically connected to the source region 1b through a contact hole 43a. The relay electrode 6b is electrically connected to the drain electrode 4a through a contact hole 43b, and is electrically connected to the drain region 1c with the drain electrode 4a interposed therebetween. The data line 6a and the relay electrode 6b are made of a conductive polysilicon film, a metal silicide film, a metal film or the like.

A third insulating interlayer 44 made of a silicon oxide film or the like is formed on the upper layer side of the data line 6a and the relay electrode 6b. A contact hole 44a leading to the relay electrode 6b is formed in the third insulating interlayer 44. The pixel electrode 9a made of a light-transmitting conductive film such as an ITO film is formed on the upper layer of the third insulating interlayer 44, and the pixel electrode 9a is electrically connected to the relay electrode 6b through the contact hole 44a. In the embodiment, the surface of the third insulating interlayer 44 is planarized.

Here, the dummy pixel electrode 9b (not shown in FIGS. 4A and 4B) described with reference to FIG. 2B and FIG. 3A is formed on the surface of the third insulating interlayer 44, and such a dummy pixel electrode 9b is made of a light-transmitting conductive film formed simultaneously with the pixel electrode 9a.

The orientation film 16 is formed on the surface of the pixel electrode 9a. The orientation film 16 is made of a resin film such as polyimide, or an obliquely vapor-deposited film such as a silicon oxide film. In the embodiment, the orientation film 16 is an inorganic orientation film (vertical orientation film) made of an obliquely vapor-deposited film such as $SiO_x$ (x<2), $SiO_2$, $TiO_2$, MgO, $Al_2O_3$, $In_2O_3$, $Sb_2O_3$, and $Ta_2O_5$, and a surface insulating film 17 such as a silicon oxide film or a silicon nitride film is formed between the orientation film 16 and the pixel electrode 9a.

The surface of the surface insulating film 17 is planarized, and a concave portion formed between the surface insulating film and the pixel electrode 9a is buried. Therefore, the orientation film 16 is formed on the planar surface of the surface insulating film 17. Such a configuration can be realized by polishing the surface of the surface insulating film 17 after the surface insulating film 17 is formed on the surface side of the pixel electrode 9a. Chemical mechanical polishing can be used in such polishing. In chemical mechanical polishing, it is possible to obtain a smooth polished surface at high speed by the action of chemical components contained in a polishing solution and the relative movement of a polishing agent and the element substrate 10. More specifically, in a polishing apparatus, while relatively moving a surface plate to which a polishing cloth (pad) made of a nonwoven fabric, foamed polyurethane, a porous fluororesin or the like is attached, and a holder that holds the element substrate 10, polishing is performed. At this time, for example, a polishing agent including cerium oxide particles having an average particle diameter of 0.01 to 20 µm, an acrylic acid ester derivative serving as a dispersing agent, and water is supplied between the polishing cloth and the element substrate 10. At this time, when the great difference in height exists between the image display region 10a and the peripheral region 10b, it is difficult to planarize the inside of the image display region 10a even when a polishing process is performed. However, in the embodiment, as described with reference to FIGS. 2A, 2B, 3A, and 3B, the dummy pixel electrode 9b is formed in the peripheral region 10b. Therefore, since the great difference in height does not exist between the image display region 10a and the peripheral region 10b in a point in time when the surface insulating film 17 is formed, it is possible to planarize the surface of the surface insulating film 17 in the inside of the image display region 10a by performing a polishing process.

In the opposing substrate 20, the common electrode 21 is formed on one surface side of the light-transmitting substrate main body 20w such as a quartz substrate or a glass substrate, and the orientation film 26 is formed so as to cover the common electrode 21. In the embodiment, the common electrode 21 is formed on the entire surface of the opposing substrate 20. Similarly to the orientation film 16, the orientation film 26 is made of a resin film such as polyimide, or an obliquely vapor-deposited film such as a silicon oxide film. In the embodiment, the orientation film 26 is an inorganic orientation film (vertical orientation film) made of an obliquely vapor-deposited film such as $SiO_x$ (x<2), $SiO_2$, $TiO_2$, MgO, $Al_2O_3$, $In_2O_3$, $Sb_2O_3$, and $Ta_2O_5$, and a protective film 27 such as a silicon oxide film or a silicon nitride film is formed between the orientation film 26 and the common electrode 21. The surface of the protective film 27 is planarized, and the orientation film 26 is formed on such a planarized surface. In the orientation films 16 and 26, a nematic liquid crystal compound having a negative dielectric anisotropy used in the liquid crystal layer 50 is vertically oriented, and the liquid crystal panel 100p operates as VA mode of normally black.

Configuration of Peripheral Region 10b

Figure 5A:
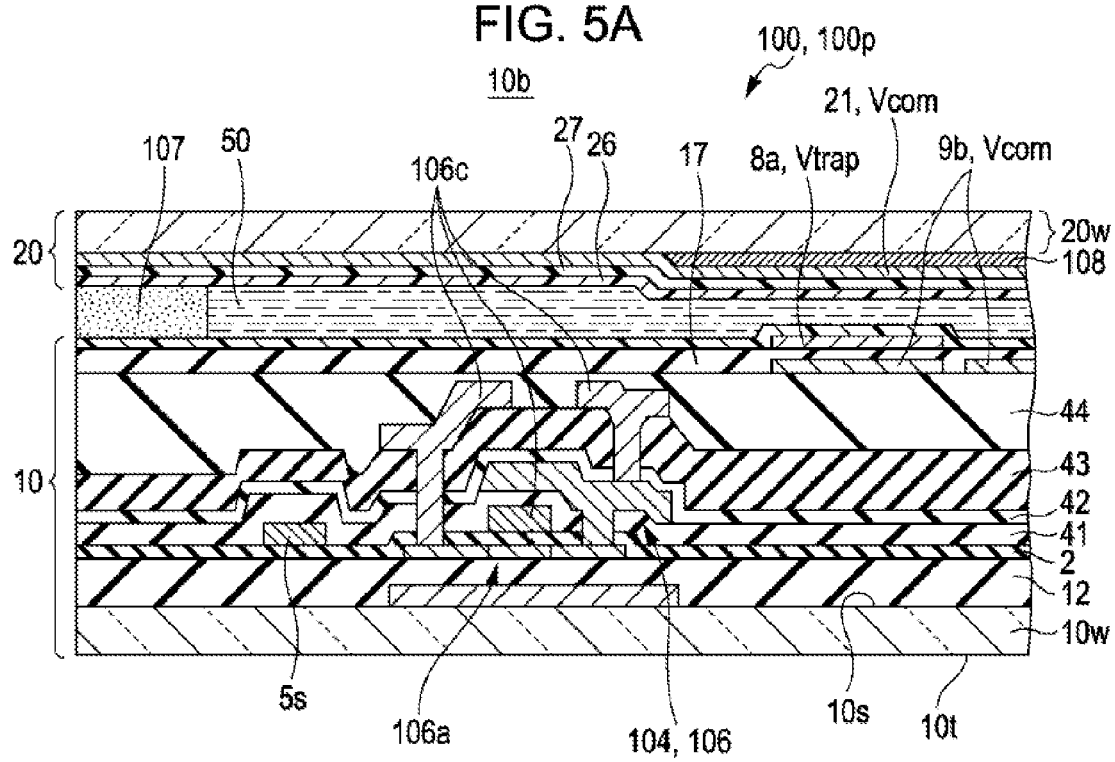
FIGS. 5A and 5B are explanatory diagrams schematically illustrating a cross-sectional configuration of a peripheral region of the liquid crystal device according to Embodiment 1 of the invention.
Figure 5B:
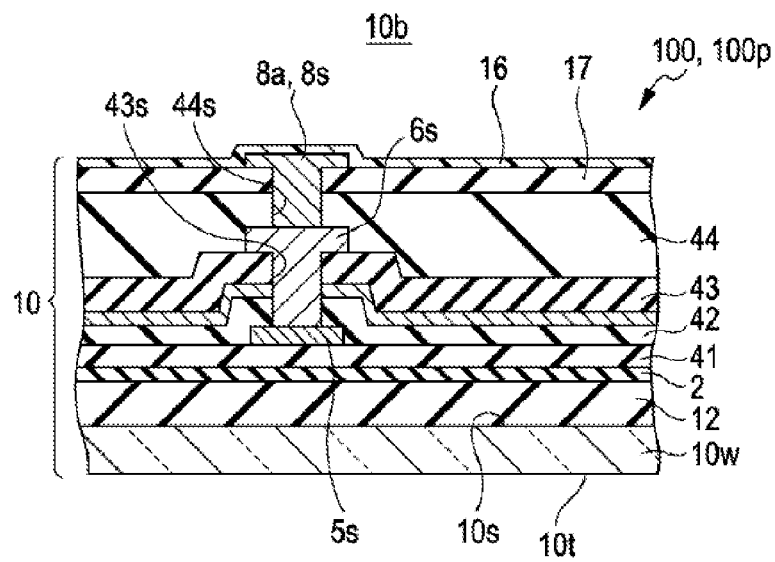

FIGS. 5A and 5B are explanatory diagrams schematically illustrating a cross-sectional configuration of the peripheral region 10b of the liquid crystal device 100 according to Embodiment 1 of the invention. FIGS. 5A and 5B are a cross-sectional view in the position equivalent to the line VA-VA of FIG. 3A, and a cross-sectional view in the position equivalent to the line VB-VB of FIG. 3B, respectively.

As shown in FIG. 5A, in the liquid crystal device 100, a complementary transistor circuit and the like including an n-channel type or p-channel type driving transistor 106a is formed in the peripheral circuit portion 106 such as the scanning line driving circuit portion 104 described with reference to FIG. 1 and FIGS. 2A and 2B. In addition, since various types of interconnections 106c and the like are also formed in the peripheral circuit portion 106. Here, the driving transistor 106a is formed using a portion of the processes of manufacturing the pixel transistor 30, regions in which the scanning line driving circuit portion 104 is formed in the element substrate 10 also have a cross-sectional configuration substantially the same as the cross-sectional configuration shown in FIG. 4B.

In addition, in the peripheral region 10b, the dummy pixel electrode 9b is formed on the surface of the third insulating interlayer 44 that covers the peripheral circuit portion 106. In the peripheral region 10b, the dummy pixel electrode 9b is electrically connected to the common potential line (not shown) using an empty region and the like of the peripheral circuit portion 106. A contact hole and the like (not shown) formed in the third insulating interlayer 44 and the like is used in the electrical connection of the dummy pixel electrode 9b to the common potential line.

Configuration of Peripheral Electrode 8a

As shown in FIGS. 2A, 2B, 3A and 3B, in the element substrate 10 of the liquid crystal device 100 according to the embodiment, the peripheral electrode 8a for ionic impurity trapping is formed in the peripheral region 10b. In the embodiment, the peripheral electrode 8a is formed in the peripheral region 10b so as to extend along the sealing material 107, and is formed in a rectangular frame shape surrounding the image display region 10a over the whole circumference thereof. For this reason, the peripheral electrode 8a includes a side 8a1 extending along the end 10a1 of the image display region 10a, a side 8a2 extending along the end 10a2, a side 8a3 extending along the end 10a3, and a side 8a4 extending along the end 10a4. In addition, the peripheral electrode 8a extends along the sealing material 107 through the inside from the inner end 101a of the data line driving circuit portion 101 and the inner end 104a of the scanning line driving circuit portion 104. For this reason, the side 8a1 of the peripheral electrode 8a extends between the inner end 101a of the data line driving circuit portion 101 and the sealing material 107, the sides 8a2 and 8a4 of the peripheral electrode 8a extends between the inner end 104a of the scanning line driving circuit portion 104 and the sealing material 107.

In addition, the trapping electrical supply line 5s is formed in the peripheral region 10b. The trapping electrical supply line 5s extends from the side 10d of the element substrate 10 through the outside of the scanning line driving circuit portion 104 toward the side where the end 10a3 (fourth side) of the image display region 10a is located, and the apical end of the trapping electrical supply line 5s and the peripheral electrode 8a are electrically conducted to each other. In the embodiment, the trapping electrical supply line 5s extends between the outside end 104b of the scanning line driving circuit portion 104, in the region on the outside from the scanning line driving circuit portion 104, and the sealing material 107 toward the side where the end 10a3 of the image display region 10a is located. In addition, the trapping electrical supply line 5s extends from a trapping electrical supply terminal 102s of a plurality of terminals 102 through the outside of the scanning line driving circuit portion 104 toward the side where the end 10a3 of the image display region 10a is located. In the embodiment, the trapping electrical supply terminal 102s is a terminal located next to the common potential terminal 102c of a plurality of terminals 102.

Here, as shown in FIGS. 5A and 5B, the peripheral electrode 8a is made of a conductive metal oxide film such as ITO or IZO formed on the upper layer side of the insulating interlayer 44, a conductive polysilicon film, a metal silicide film, metal film, or the like. In the embodiment, the peripheral electrode 8a is formed on the upper layer of the surface protective film 17 on the upper layer side of the insulating interlayer 44, and the surface protective film 17 and the orientation film 16 are formed on the upper layer side of the peripheral electrode 8a. In addition, the peripheral electrode 8a is formed in a region overlapping the dummy pixel electrode 9b, and is electrically connected to the trapping electrical supply line 5s shown in FIGS. 1, 2A and 3A using an empty region and the like of the dummy pixel electrode 9b or the driving circuit portion 106.

As shown in FIG. 5B, a relay electrode 6s or contact holes 43s and 44s formed in an insulating interlayer interposed between the peripheral electrode 8a and the trapping electrical supply line 5s are used in such a electrical connection. More specifically, first, the trapping electrical supply line 5s is made of a conductive film formed simultaneously with the gate electrode 3c (scanning line 3a). For this reason, in the embodiment, the relay electrode 6s is formed on the upper layer of the second insulating interlayer 43, and the relay electrode 6s is electrically conducted to the trapping electrical supply line 5s through the contact hole 43s passing through the second insulating interlayer 43, the dielectric layer 42, and the first insulating interlayer 41. In addition, a contact hole 44s reaching the relay electrode 6s is formed in the surface insulating film 17 and the third insulating interlayer 44, and a conductive portion 8s overlapping the relay electrode 6s is formed on the peripheral electrode 8a. For this reason, the peripheral electrode 8a is electrically conducted to the relay electrode 6s through the contact hole 44s, and is electrically conducted to the trapping electrical supply line 5s through the contact hole 44s and the like. Here, the relay electrode 6s is made of a conductive film formed simultaneously with the data line 6a. Meanwhile, the trapping electrical supply line 5s can be made of a conductive film formed simultaneously with the data line 6a. In this case, the conductive portion 8s of the peripheral electrode 8a electrically conducts to the trapping electrical supply line 5s through the contact hole 44s.

In the liquid crystal device 100 having such a configuration, the common potential Vcom applied to the common electrode 21 and the dummy pixel electrode 9b is 0 V and constant, and the polarity of the signal applied to the pixel electrode 9a is reversed. In addition, the polarity of the potential Vtrap for ionic impurity trapping applied to the peripheral electrode 8a through the trapping electrical supply terminal 102s and the trapping electrical supply line 5s is also reversed. For example, the polarity of the alternating potential Vtrap applied to the peripheral electrode 8a is reversed at the same timing as the timing when the polarity of the signal applied to the pixel electrode 9a is reversed. In addition, a configuration may be adopted in which the polarity of the alternating potential Vtrap applied to the peripheral electrode 8a is reversed at a higher frequency than that in the timing when the polarity of the signal applied to the pixel electrode 9a is reversed. Even when any of the driving methods are adopted, the potential Vtrap applied to the peripheral electrode 8a is always different from the common potential Vcom (0V) applied to the common electrode 21 and the dummy pixel electrode 9b. Therefore, even though an ionic impurity mixed at the time of the liquid crystal injection when the liquid crystal device 100 is manufactured, an ionic impurity eluted from the sealing material 107, and an ionic impurity eluted from the sealing material 105 exist within the liquid crystal layer 50, an electric field in the thickness direction of the liquid crystal layer 50 is generated between the peripheral electrode 8a and the common electrode 21 when the potential Vtrap is applied to the peripheral electrode 8a. For this reason, even though the ionic impurity mixed at the time of the liquid crystal injection and the ionic impurity eluted from the sealing material 107 exist in the liquid crystal layer 50, these ionic impurities are efficiently attracted to the peripheral electrode 8a and the portion which is opposed to the peripheral electrode 8a in the common electrode 21, and are retained therein. Therefore, the ionic impurities are not agglomerated in the image display region 10a.

Therefore, when the liquid crystal device 100 is manufactured, and then the potential Vtrap for ionic impurity trapping is applied to the peripheral electrode 8a at the time of the inspection of the liquid crystal device 100 and the common potential Vcom is applied to the common electrode 21, it is possible to attract the ionic impurity to the side where the peripheral electrode 8a is located, and to retain the ionic impurity therein. In addition, when the liquid crystal device 100 performs a display operation, the attitude of liquid crystal molecules used in the liquid crystal layer 50 is switched. Even when the ionic impurity in the liquid crystal layer 50 concentrates on the angular portion of the image display region 10a due to the following minute fluctuation of the liquid crystal molecule, the ionic impurity is attracted to the side where the peripheral electrode 8a is located, and thus is retained at a state where it is agglomerated. Particularly, when unbalance occurs in a direct-current component at the time of reversely driving the liquid crystal device 100, the ionic impurity in the liquid crystal layer 50 easily concentrates on the angular portion of the image display region 10a. However, according to the embodiment, the ionic impurity is attracted to the side where the peripheral electrode 8a is located, and is retained therein at a state where it is agglomerated. Therefore, since the ionic impurity is not agglomerated in the image display region 10a, it is possible to prevent the deterioration of the image quality caused by the ionic impurity from occurring.

Main Effect of the Embodiment

As described above, in the liquid crystal device 100 according to the embodiment, the peripheral electrode 8a to which the potential Vtrap different from the common potential Vcom is applied is provided in the peripheral region 10b of the element substrate 10. Therefore, since the ionic impurity is agglomerated in the image display region 10a, it is possible to prevent the display quality caused by the ionic impurity from being deteriorated. Particularly, in the case of the liquid crystal device 100 of VA mode, the angular region ionic impurity of the opposite angle corresponding to the pretilt orientation is easily maldistributed by the flow when the attitude of the liquid crystal molecules switches to the procumbent attitude horizontally with the vertical attitude. However, in the embodiment, it is possible to effectively trap the ionic impurity by the peripheral electrode 8a. In addition, when an inorganic orientation film is used as the orientation films 16 and 26, the inorganic orientation film tends to easily adsorb the ionic impurity. However, in the embodiment, it is possible to effectively trap the ionic impurity by the peripheral electrode 8a. Therefore, even when the inorganic orientation film is used in the liquid crystal device 100 of VA mode, it is possible to reliably prevent the ionic impurity from being agglomerated in the image display region 10a. Therefore, it is possible to prevent the ionic impurity from being agglomerated in the image display region 10a, and thus it is possible to prevent the display quality from being deteriorated due to the agglomeration of the ionic impurity.

In addition, the element substrate 10 is provided with the data line driving circuit portion 101 and the terminal 102 between the end 10a1 of the image display region 10a and the side 10d (first side) of the element substrate 10, and is provided with the scanning line driving circuit portion 104 between the ends 10a2 and 10a4 of the image display region 10a and the sides 10e and 10g (second side) of the element substrate 10. Here, in the embodiment, the trapping electrical supply line 5s that supplies the potential Vtrap for ionic impurity trapping from the side 10d of the element substrate 10 to the peripheral electrode 8a extends through the outside from the scanning line driving circuit portion 104 toward the side 10f (third side) of the element substrate 10. For this reason, the trapping electrical supply line 5s extends without intersecting the signal line 106c (see FIG. 5A) provided in the scanning line driving circuit portion 104 or the data line driving circuit portion 101, or the signal lines 106e and 106f extending toward the data line driving circuit portion 101 or the scanning line driving circuit portion 104. Therefore, when an alternating current is applied to the trapping electrical supply line 5s, coupling is not generated between the trapping electrical supply line 5s and the signal lines 106c, 106e, and 106f, and thus there is no influence on the signal used in the driving circuit portion 106. Therefore, it is possible to prevent the display quality from being deteriorated due to the potential Vtrap for ionic impurity trapping.

Meanwhile, in the embodiment, the peripheral electrode 8a extends along the sealing material 107 through the inside from the inner end 101a of the data line driving circuit portion 101 and the inner end 104a of the scanning line driving circuit portion 104. For this reason, the peripheral electrode 8a intersects the data line 6a or the scanning line 3a, but in the embodiment, the insulating interlayer 44 and the like are interposed between the peripheral electrode 8a and the data line 6a, or between the peripheral electrode 8a and the scanning line 3a. Therefore, coupling is scarcely generated between the peripheral electrode 8a and the data line 6a, or between the peripheral electrode 8a and the scanning line 3a.

Embodiment 2

Figure 6A:
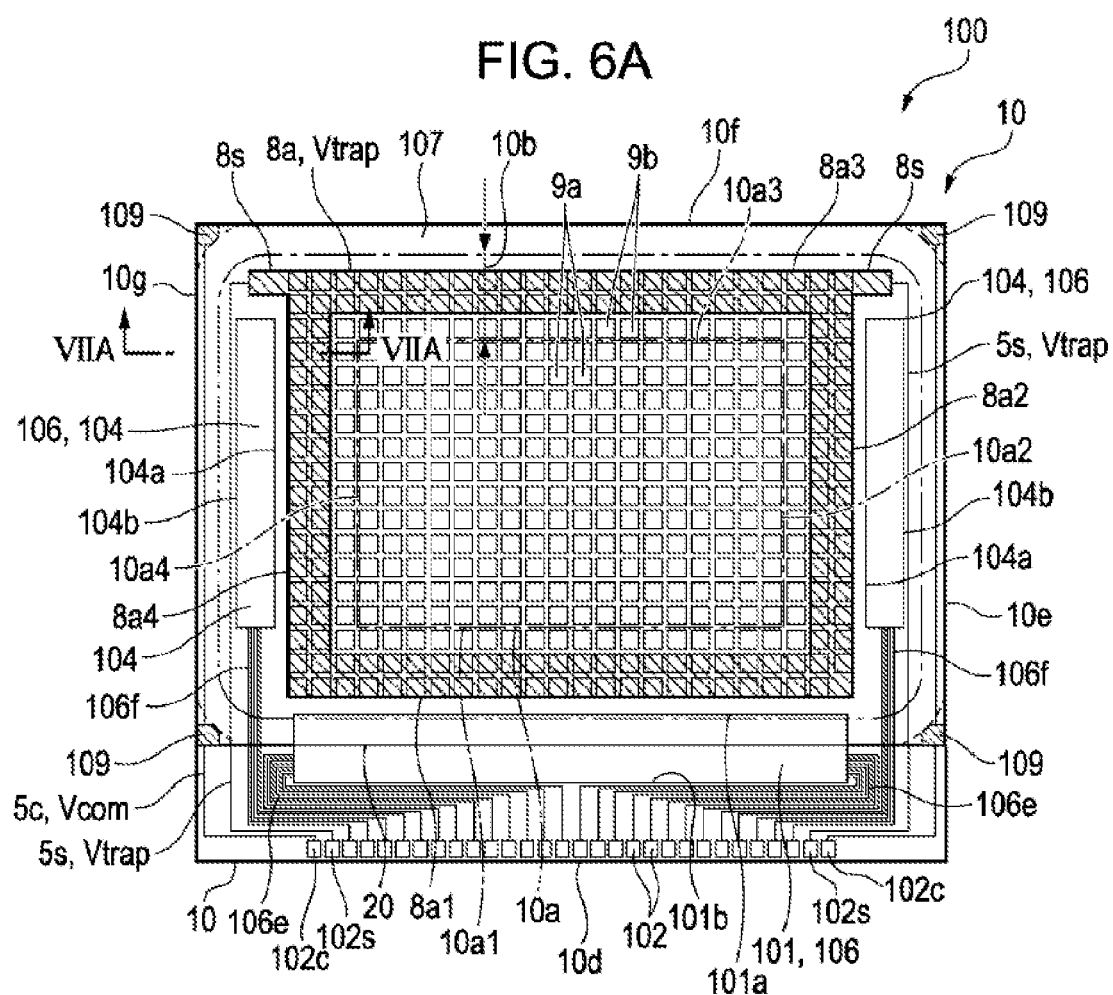
FIGS. 6A and 6B are explanatory diagrams illustrating an electrode and the like formed in the element substrate of the liquid crystal device according to Embodiment 2 of the invention.
Figure 6B:
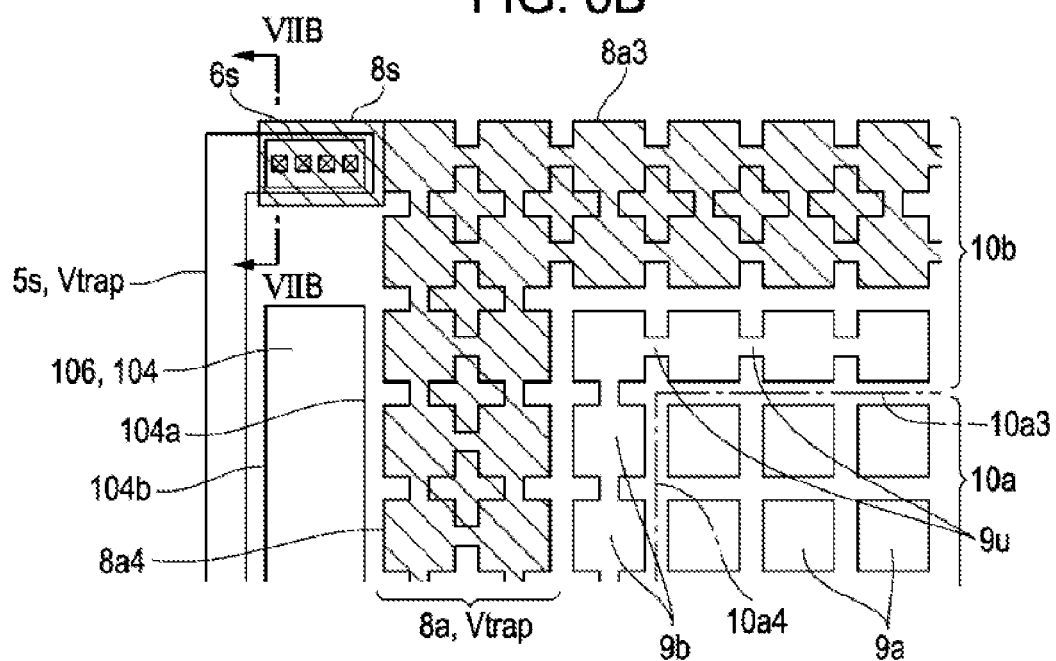
Figure 7A:
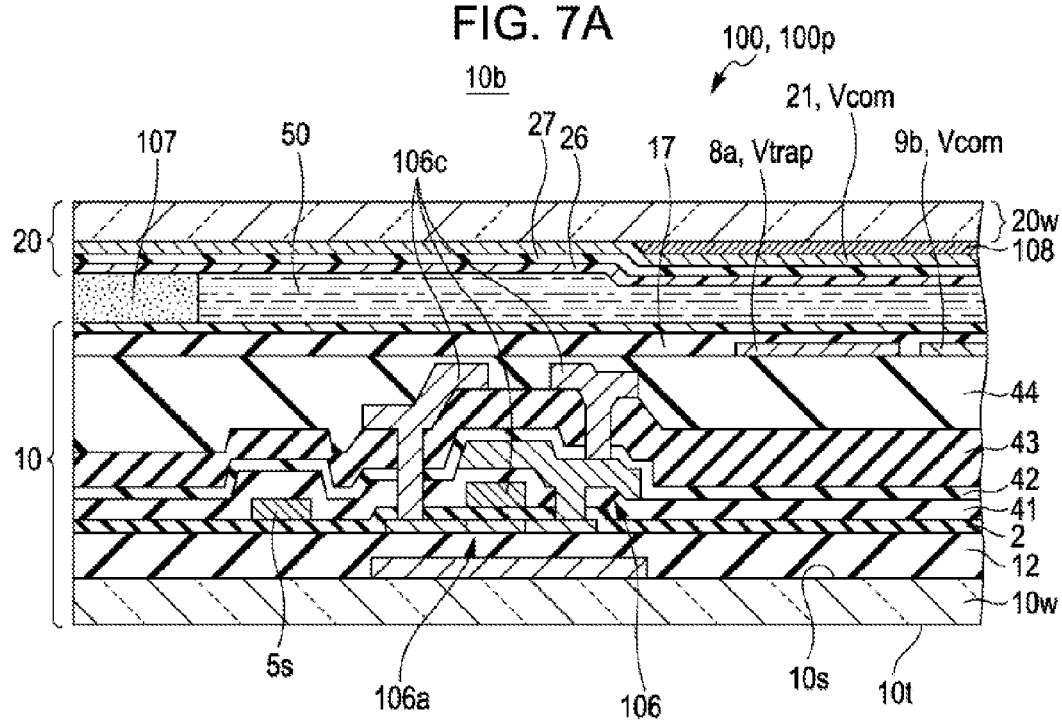
FIGS. 7A and 7B are explanatory diagrams schematically illustrating a cross-sectional configuration of a peripheral region of the liquid crystal device according to Embodiment 2 of the invention.
Figure 7B:
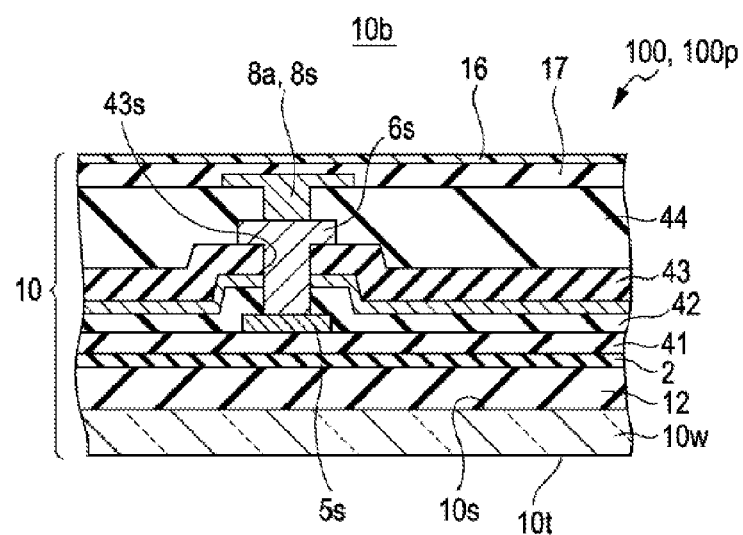

FIGS. 6A and 6B are explanatory diagrams illustrating an electrode and the formed in the element substrate 10 of the liquid crystal device 100 according to Embodiment 2 of the invention. FIGS. 6A and 6B are an explanatory diagram illustrating a planar layout of the pixel electrode 9a and the like in the entire element substrate 10, and an explanatory diagram illustrating a planar layout of the dummy pixel electrode 9b in the peripheral region 10b, respectively. FIGS. 7A and 7B are explanatory diagrams schematically illustrating a cross-sectional configuration of the peripheral region 10b of the liquid crystal device 100 according to Embodiment 2 of the invention. FIGS. 7A and 7B are a cross-sectional view in the position equivalent to the line VIIA-VIIA of FIG. 6A, and a cross-sectional view in the position equivalent to the line VIIB-VIIB of FIG. 6B.

As shown in FIGS. 6A and 6B, in the embodiment, similarly to Embodiment 1, the peripheral region 10b of the element substrate 10 is provided with the peripheral electrode 8a to which the potential Vtrap different from the common potential Vcom is applied. In addition, in the element substrate 10, the trapping electrical supply line 5s that supplies the potential Vtrap for ionic impurity trapping from the side 10d to the peripheral electrode 8a runs through the outside from the scanning line driving circuit portion 104.

In realizing such a configuration, the peripheral electrode 8a is formed by a separate process from the dummy pixel electrode 9b in Embodiment 1. However, in the embodiment, as shown in FIGS. 7A and 7B, the peripheral electrode 8a is made of a conductive film formed simultaneously with the dummy pixel electrode 9b. For this reason, similarly to the dummy pixel electrode 9b, the peripheral electrode 8a is formed on the upper layer of the third insulating interlayer 44, and the surface insulating film 17 and the orientation film 16 are formed on the upper layer side of the peripheral electrode 8a. In addition, as shown in FIG. 6B, the peripheral electrode 8a is formed in a planar shape similarly to the dummy pixel electrode 9b. For this reason, in the peripheral electrode 8a, the difference in height between the image display region 10a and the peripheral region 10b is alleviated similarly to the dummy pixel electrode 9b. Therefore, it is possible to planarize the surface of the surface insulating film 17 within the image display region 10a.

Embodiment 3

Figure 8A:
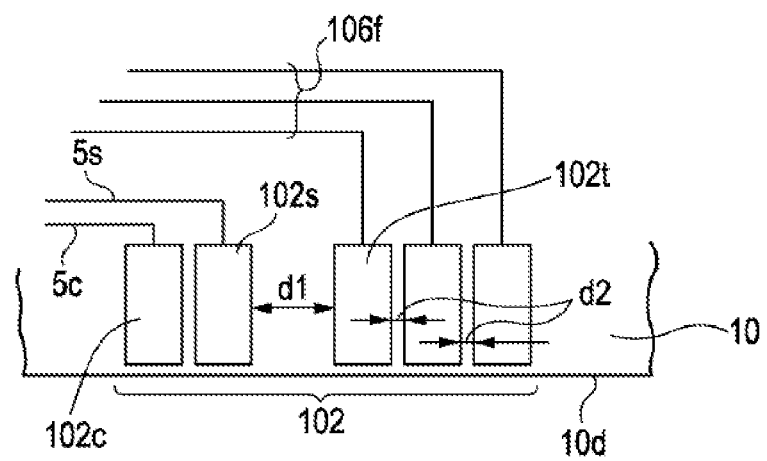
FIGS. 8A and 8B are explanatory diagrams illustrating terminals formed in the element substrate of the liquid crystal device according to Embodiment 3 of the invention.
Figure 8B:
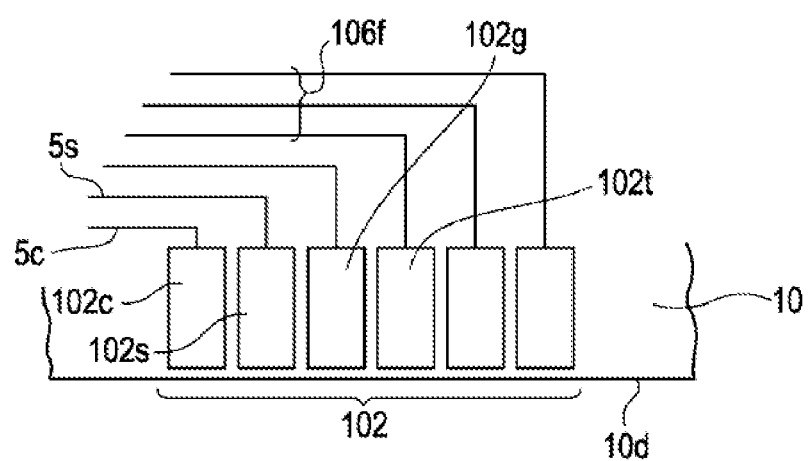

FIGS. 8A and 8B are explanatory diagrams illustrating the terminal 102 formed in the element substrate 10 of the liquid crystal device 100 according to Embodiment 3 of the invention. FIGS. 8A and 8B are an explanatory diagram illustrating a layout of the terminal 102, and an explanatory diagram illustrating a separate layout of the terminal 102.

As shown in FIGS. 8A and 8B, in the embodiment, the terminal 102 located at the endmost portion of a plurality of terminals 102 is the common potential terminal 102c which is connected to the common potential line 5c similarly to Embodiment 1, and the terminal 102 next to the common potential terminal 102c is the trapping electrical supply terminal 102s which is connected to the trapping electrical supply line 5s.

Here, in the configuration shown in FIG. 8A, in a plurality of terminals 102, the distance d1 between the terminals of the trapping electrical supply terminal 102s and a signal terminal 102t adjacent to the trapping electrical supply terminal 102s is larger than other distances d2 between the terminals in a plurality of terminals 102. For this reason, a gap between the trapping electrical supply line 5s and the signal line 106f extending from the signal terminal 102t toward the scanning line driving circuit portion 104 is large. Therefore, when an alternating current is applied to the trapping electrical supply line 5s, coupling is not generated between the trapping electrical supply line 5s and the signal line 106f, and thus there is no influence on the signal used in the scanning line driving circuit portion 104.

In addition, in the configuration shown in FIG. 8A, in a plurality of terminals 102, the configuration of a constant potential terminal 102g may be adopted in the terminal 102 adjacent on the side opposite to the common potential terminal 102c with respect to the trapping electrical supply terminal 102s. According to such a configuration, both sides of the trapping electrical supply terminal 102s are interposed between the constant potential terminals (common potential terminal 102c and terminal 102g). For this reason, when an alternating current is applied to the trapping electrical supply line 5s, coupling is not generated between the trapping electrical supply line 5s and the signal line 106e, and thus there is no influence on the signal used in the scanning line driving circuit portion 104.

Embodiment 4

Figure 9A:
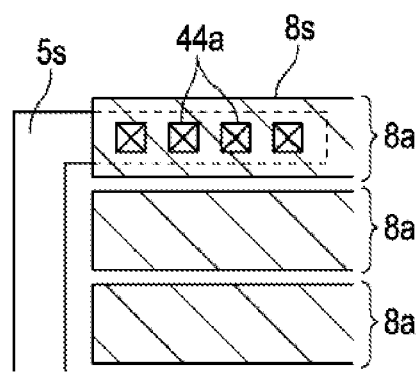
FIGS. 9A and 9B are explanatory diagrams illustrating the vicinity of a conductive portion between a peripheral electrode and a trapping electrical supply line in the element substrate of the liquid crystal device according to Embodiment 4 of the invention.
Figure 9B:
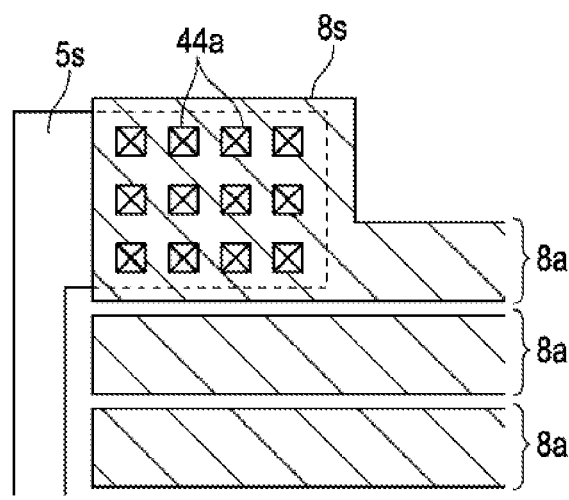

FIGS. 9A and 9B are explanatory diagrams illustrating the vicinity of the conductive portion between the peripheral electrode 8a and the trapping electrical supply line 5s in the element substrate 10 of the liquid crystal device 100 according to Embodiment 4 of the invention. FIGS. 9A and 9B are an explanatory diagram illustrating an example in which a plurality of peripheral electrodes 8a are formed, and an explanatory diagram illustrating an example in which one peripheral electrode 8a of a plurality of peripheral electrodes 8a is widely formed, respectively.

In Embodiment 1 or the like, although one peripheral electrode 8a is formed, a configuration in which a plurality of peripheral electrodes 8a are formed in parallel with each other may be adopted as shown in FIGS. 9A and 9B. In such a configuration, when a plurality of peripheral electrodes 8a are connected to each other and any one of a plurality of peripheral electrodes 8a is caused to electrically conduct to the trapping electrical supply line 5s, it is possible to apply the potential Vtrap for ionic impurity trapping to the entirety of a plurality of peripheral electrodes 8a.

Here, in the configuration example shown in FIG. 9B, the width dimension of the conductive portion 8s to the trapping electrical supply line 5s through the contact hole 44a formed in the third insulating interlayer 44 is larger than the width dimensions of other portions in the peripheral electrode 8a. Therefore, it is possible to reliably allow electrical conduction between the trapping electrical supply line 5s and the peripheral electrode 8a.

Other Embodiments

In the above-mentioned embodiment, although the peripheral electrode 8a is configured to be connected all around, the peripheral electrode 8a may be partially discontinued insofar as it has a configuration capable of applying the potential Vtrap for ionic impurity trapping. In addition, as in Embodiment 4, when a plurality of peripheral electrodes 8 are formed, a different potential Vtrap for ionic impurity trapping may be applied to a plurality of peripheral electrodes 8a.

In the above-mentioned embodiment, although the invention is applied to the transmissive liquid crystal device 100, the invention may be applied to the reflective liquid crystal device 100.

Example of Mounting in Electronic Device

Figure 10A:
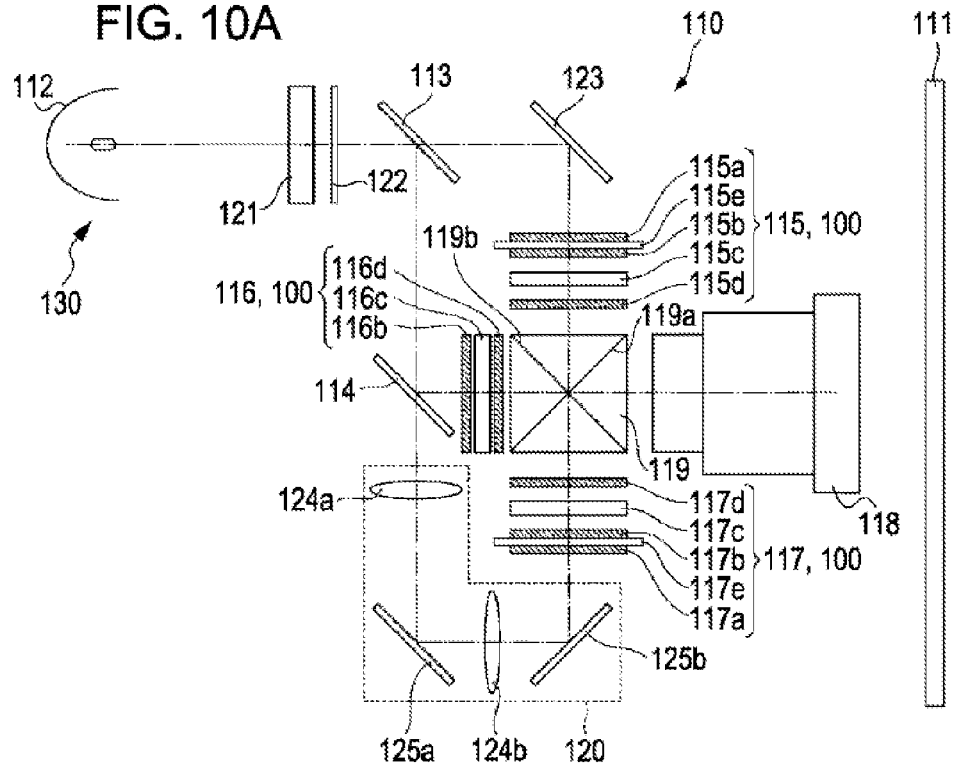
FIGS. 10A and 10B are schematic configuration diagrams schematically a projection-type display device making use of the liquid crystal device to which the invention is applied.
Figure 10B:
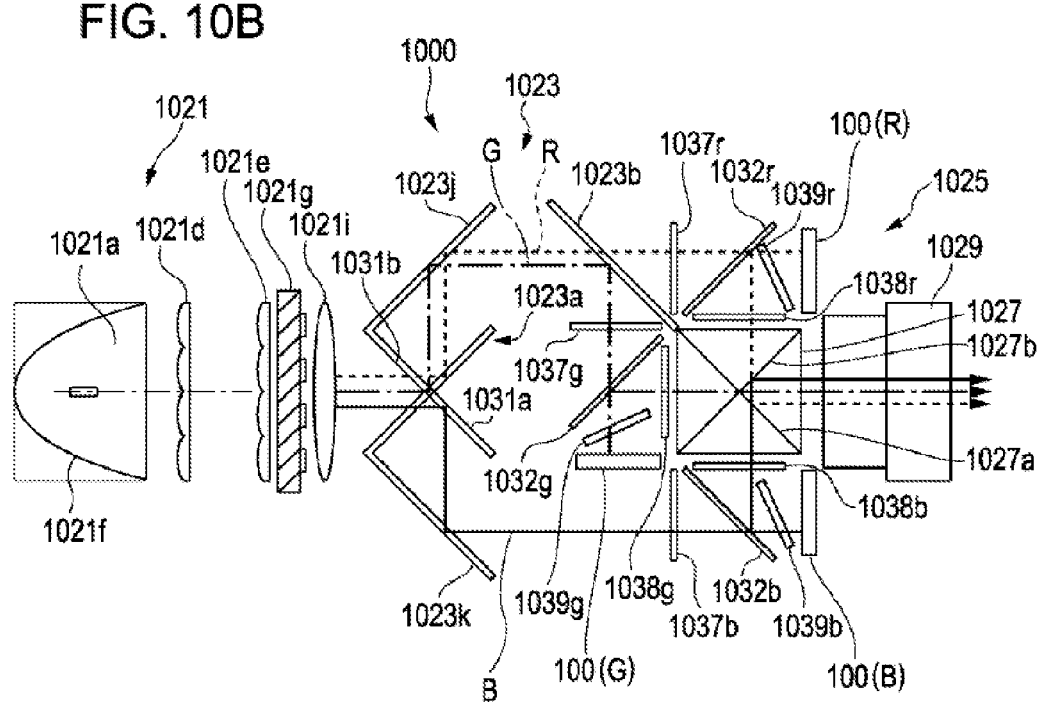

An electronic device to which the liquid crystal device 100 according to the above-mentioned embodiment is applied will be described. FIGS. 10A and 10B are schematic configuration diagrams illustrating a projection-type display device making use of the liquid crystal device 100 to which the invention is applied. FIGS. 10A and 10B are an explanatory diagram illustrating the projection-type display device making use of the transmissive liquid crystal device 100, and an explanatory diagram illustrating the projection-type display device making use of the reflective liquid crystal device 100, respectively.

First Example of Projection-Type Display Device

A projection-type display device 110 shown in FIG. 10A is a so-called projection-type display device in which a screen 111 provided at the observer side is eradiated with light, and light reflected from the screen 111 is observed. The projection-type display device 110 includes a light source portion 130 including a light source 112, dichroic mirrors 113 and 114, liquid crystal light valves 115 to 117 (liquid crystal device 100), a projection-type optical system 118, a cross dichroic prism 119, and a relay system 120.

The light source 112 is composed of an extra-high pressure mercury lamp that supplies light including red light, green light and blue light. The dichroic mirror 113 transmits the red light emitted from the light source 112 and reflects the green light and the blue light. In addition, the dichroic mirror 114 transmits the blue light out of the green light and the blue light which are reflected from the dichroic mirror 113 and reflects the green light. In this manner, the dichroic mirrors 113 and 114 constitutes an color separation optical system that separates light emitted from the light source 112 into the red light, green light and the blue light.

Here, an integrator 121 and a polarization conversion element 122 are disposed between the dichroic mirror 113 and the light source 112 in order from the light source 112. The integrator 121 uniformizes the illuminance distribution of light emitted from the light source 112. In addition, the polarization conversion element 122 converts light emitted from the light source 112 into polarized light, for example, such as s-polarized light, having a specific vibration direction.

The liquid crystal light valve 115 is the transmissive liquid crystal device 100 that modulates the red light which passes through the dichroic mirror 113 and is reflected from the reflective mirror 123 in accordance with the image signal. The liquid crystal light valve 115 includes a λ/2 phase difference plate 115a, a first polarizing plate 115b, a liquid crystal panel 115c and a second polarizing plate 115d. Here, even when the red light incident on the liquid crystal light valve 115 passes through the dichroic mirror 113, the polarization of light does not change. Therefore, the blue light is s-polarized light as it is.

The λ/2 phase difference plate 115a is an optical element that converts the s-polarized light incident on the liquid crystal light valve 115 into p-polarized light. In addition, the first polarizing plate 115b is a polarizing plate that blocks the s-polarized light and transmits the p-polarized light. The liquid crystal panel 115c converts the p-polarized light into the s-polarized light (circularly polarized light or elliptically polarized light in the case of a half tone) by the modulation in accordance with the image signal. Further, the second polarizing plate 115d is a polarizing plate that blocks the p-polarized light and transmits the s-polarized light. Therefore, the liquid crystal light valve 115 modulates the red light in accordance with the image signal, and emits the modulate red light toward the cross dichroic prism 119.

Meanwhile, the λ/2 phase difference plate 115a and the first polarizing plate 115b are disposed in the state where they are in contact with a light-transmitting glass plate 115e which does not convert polarized light, and it is possible to prevent the λ/2 phase difference plate 115a and the first polarizing plate 115b from being warped by the generation of heat.

The liquid crystal light valve 116 is the transmissive liquid crystal device 100 that modulates the green light which is reflected from the dichroic mirror 113 and then reflected from the dichroic mirror 114 in accordance with the image signal. Similarly to the liquid crystal light valve 115, the liquid crystal light valve 116 includes a first polarizing plate 116b, a liquid crystal panel 116c and a second polarizing plate 116d. The green light incident on the liquid crystal light valve 116 is incident s-polarized light reflected from the dichroic mirrors 113 and 114. The first polarizing plate 116b is a polarizing plate that blocks the p-polarized light and transmits the s-polarized light. In addition, the liquid crystal panel 116c converts the s-polarized light into the p-polarized light (circularly polarized light or elliptically polarized light in the case of a half tone) by the modulation in accordance with the image signal. The second polarizing plate 116d is a polarizing plate that blocks the s-polarized light and transmits the p-polarized light. Therefore, the liquid crystal light valve 116 modulates the green light in accordance with the image signal, and emits the modulated green light toward the cross dichroic prism 119.

The liquid crystal light valve 117 is the transmissive liquid crystal device 100 that modulates the blue light which is reflected from the dichroic mirror 113, passes through the dichroic mirror 114 and then goes through the relay system 120 in accordance with the image signal. Similarly to the liquid crystal light valves 115 and 116, the liquid crystal light valve 117 includes a λ/2 phase difference plate 117a, a first polarizing plate 117b, a liquid crystal panel 117c and a second polarizing plate 117d. Here, the blue light incident on the liquid crystal light valve 117 becomes s-polarized light because it is reflected from the dichroic mirror 113, passes through the dichroic mirror 114, and then is reflected from two reflective mirrors 125a and 125b, described later, of the relay system 120.

The λ/2 phase difference plate 117a is an optical element that converts the s-polarized light incident on the liquid crystal light valve 117 into the p-polarized light. In addition, the first polarizing plate 117b is a polarizing plate that blocks the s-polarized light and transmits the p-polarized light. The liquid crystal panel 117c converts the p-polarized light into the s-polarized light (circularly polarized light or elliptically polarized light in the case of a halftone) by the modulation in accordance with the image signal. Further, the second polarizing plate 117d is a polarizing plate that blocks the p-polarized light and transmits the s-polarized light. Therefore, the liquid crystal light valve 117 modulates the blue light in accordance with the image signal, and emits the modulated blue light toward the cross dichroic prism 119. Meanwhile, the λ/2 phase difference plate 117a and the first polarizing plate 117b are disposed in the state where they are in contact with a glass plate 117e.

The relay system 120 includes relay lenses 124a and 124b and reflective mirrors 125a and 125b. The relay lenses 124a and 124b are provided in order to prevent a light loss due to a long light path of the blue light. Here, the relay lens 124a is disposed between the dichroic mirror 114 and the reflective mirror 125a. In addition, the relay lens 124b is disposed between the reflective mirrors 125a and 125b. The reflective mirror 125a is disposed so as to reflect the blue light, which passes through the dichroic mirror 114 and is emitted from the relay lens 124a, toward the relay lens 124b. In addition, the reflective mirror 125b is disposed so as to reflect the blue light, which is emitted from the relay lens 124b toward the liquid crystal light valve 117.

The cross dichroic prism 119 is a color synthesis optical system in which two dichroic films 119a and 119b are orthogonally disposed in an X shape. The dichroic film 119a is a film that reflects the blue light and transmits the green light, and the dichroic film 119b is a film that reflects the red light and transmits the green light. Therefore, the cross dichroic prism 119 synthesizes the red light, the green light and the blue light modulated in each of the liquid crystal light valves 115 to 117, and emits synthesized light toward the projection-type optical system 118.

Meanwhile, light incident on the cross dichroic prism 119 from the liquid crystal light valves 115 and 117 is s-polarized light, and light incident on the cross dichroic prism 119 from the liquid crystal light valve 116 is p-polarized light. In this manner, light incident on the cross dichroic prism 119 is converted into a different type of polarized light, thereby allowing the light incident from each of the liquid crystal light valves 115 to 117 to be synthesized in the cross dichroic prism 119. Here, generally, the dichroic films 119a and 119b have excellent reflective transistor characteristics of the s-polarized light. For this reason, the red light and the blue light reflected from the dichroic films 119a and 119b are converted into the s-polarized light, and the green light passing through the dichroic films 119a and 119b is converted into the p-polarized light. The projection-type optical system 118 is configured to have a projection lens (not shown), and project the light synthesized in the cross dichroic prism 119 onto the screen 111.

Second Example of Projection-Type Display Device

A projection-type display device 1000 shown in FIG. 10B includes a light source portion 1021 that generate light source light, a color separation light-guiding optical system 1023 that separates the light source light emitted from the light source portion 1021 into three colors of red, green and blue, and a light modulation portion 1025 which is illuminated with the light source light of each color emitted from the color separation light-guiding optical system 1023. In addition, the projection-type display device 1000 includes a cross dichroic prism 1027 (synthesis optical system) that synthesizes image light of each color emitted from the light modulation portion 1025, and a projection-type optical system 1029 which is a projection-type optical system for projecting the image light going through the cross dichroic prism 1027 onto a screen (not shown).

In such a projection-type display device 1000, the light source portion 1021 includes a light source 1021a, a pair of fly's eye optical systems 1021d and 1021e, a polarization conversion member 1021g, and a superposition lens 1021i. In the embodiment, the light source portion 1021 includes a reflector 1021f made of a parabolic surface, and emits parallel light. The fly's eye optical systems 1021d and 1021e are composed of a plurality of element lenses disposed in a matrix within the surface intersecting a system optical axis, and divide light source light by these element lenses and individually condense and diffuse the divided light source light. The polarization conversion member 1021g converts the light source light emitted from the fly's eye optical system 1021e into, for example, only a p-polarized light component parallel to the drawing and supplies the converted light to a light path downstream optical system. The superposition lens 1021i appropriately collects the light source light going through the polarization conversion member 1021g as a whole, thereby allowing each of a plurality of liquid crystal devices 100 provided in the light modulation portion 1025 to be uniformly superimposedly illuminated.

The color separation light-guiding optical system 1023 includes a cross dichroic mirror 1023a, a dichroic mirror 1023b, and reflective mirrors 1023j and 1023k. In the color separation light-guiding optical system 1023, the substantially white light source light emitted from the light source portion 1021 is incident on the cross dichroic mirror 1023a. Light of red (R) reflected from one first dichroic mirror 1031a constituting the cross dichroic mirror 1023a is reflected from the reflective mirror 1023j, passes through the dichroic mirror 1023b, and is incident on the liquid crystal device 100 for red (R), as p-polarized light, through an incident-side polarizing plate 1037r, a wire grid polarizing plate 1032r that transmits the p-polarized light and reflects the s-polarized light, and an optical compensation plate 1039r.

In addition, light of green (G) reflected from the first dichroic mirror 1031a is reflected from the reflective mirror 1023j and then also reflected from the dichroic mirror 1023b, and is incident on the liquid crystal device 100 for green (G), as p-polarized light, through an incident-side polarizing plate 1037g, a wire grid polarizing plate 1032g that transmits the p-polarized light and reflects the s-polarized light, and an optical compensation plate 1039g.

On the other hand, light of blue (B) reflected from the other second dichroic mirror 1031b constituting the cross dichroic mirror 1023a is reflected from the reflective mirror 1023k, and is incident on the liquid crystal device 100 for blue (B), as p-polarized light, through an incident-side polarizing plate 1037b, a wire grid polarizing plate 1032b that transmits the p-polarized light and reflects the s-polarized light, and an optical compensation plate 1039b.

Meanwhile, the optical compensation plates 1039r, 1039g, and 1039b optically compensate for the characteristics of the liquid crystal layer by adjusting the polarization state of incident light and exit light on and to the liquid crystal device 100.

In projection-type display device 1000 having such a configuration, light of three colors incident through the optical compensation plates 1039r, 1039g, and 1039b is respectively modulated in each of the liquid crystal devices 100. At this time, component light of s-polarized light in the modulated light emitted from the liquid crystal device 100 is reflected in the wire grid polarizing plates 1032r, 1032g, and 1032b, and is incident on the cross dichroic prism 1027 through exit-side polarizing plates 1038r, 1038g, and 1038b. A first dielectric multilayer film 1027a and a second dielectric multilayer film 1027b intersecting each other in an X shape are formed in the cross dichroic prism 1027. The first dielectric multilayer film 1027a reflects R light, and the second dielectric multilayer film 1027b reflects B light. Therefore, the light of three colors is synthesized in the cross dichroic prism 1027, and is emitted to the projection-type optical system 1029. The projection-type optical system 1029 then projects image light of the colors synthesized in the cross dichroic prism 1027 onto a screen (not shown) at a desired magnification.

Other Projection-Type Display Device

Meanwhile, the projection-type display device may be configured to use an LED light source and the like for emitting light of each color as the light source portion, and to supply colored light emitted from the LED light source to a separate liquid crystal device.

Other Electronic Devices

The liquid crystal device 100 to which the invention is applied may be used as a direct-view-type display device in the electronic devices such as devices including a cellular phone, a PDA (Personal Digital Assistant), a digital camera, a liquid crystal television, a car navigation device, a videophone, a POS terminal, and a touch panel, in addition to the above-mentioned electronic device.

This application claims priority from Japanese Patent Application No. 2011-073575 filed in the Japanese Patent Office on Mar. 29, 2011, the entire disclosure of which is hereby incorporated by reference in its entirely.

What is claimed is:

1. A liquid crystal device comprising:
   an element substrate, provided with an image display region in which a plurality of pixel electrodes are arranged, at one surface side, which has a first side, a second side intersecting the first side, and a third side opposed to the first side and intersecting the second side;
   an opposing substrate provided with a common electrode to which a common potential is applied;
   a sealing material that bonds the element substrate to the opposing substrate; and
   a liquid crystal layer which is held within a region surrounded by the sealing material between the element substrate and the opposing substrate,
   wherein the one surface side of the element substrate is provided with
   a first driving circuit portion provided between the image display region and the first side,
   a plurality of terminals, provided between the first driving circuit portion and the first side, which are provided along the first side,
   a second driving circuit portion provided between the image display region and the second side,
   a common line, extending from the first side toward the third side between the second driving circuit portion and the second side, which supplies the common potential,
   an electrical supply line, extending from the first side toward the third side between the second driving circuit portion and the common line, which supplies a trapping potential that is different from the common potential, and
   an electrode that is electrically connected to the electrical supply line in a region interposed between the image display region and the sealing material.

2. The liquid crystal device according to claim 1, wherein the electrical supply line is electrically connected to an electrical supply terminal of the plurality of terminals to which the trapping potential is supplied.

3. The liquid crystal device according to claim 2, wherein in the plurality of terminals, an inter-terminal distance between the electrical supply terminal and a signal terminal adjacent to the electrical supply terminal is larger than other inter-terminal distances in the plurality of terminals.

4. The liquid crystal device according to claim 2, wherein in the plurality of terminals, a terminal adjacent to the electrical supply terminal is a constant potential terminal.

5. The liquid crystal device according to claim 1, wherein an insulating interlayer is provided at a side of the electrical supply line in which the opposing substrate is located,
   the electrode is provided at a side of the insulating interlayer in which the opposing substrate is located, and
   in the electrode, a width dimension of a conductive portion to the electrical supply line through a contact hole formed in the insulating interlayer is larger than width dimensions of other portions in the electrode.

6. The liquid crystal device according to claim 1, wherein the electrode extends along the sealing material between the image display region and the first driving circuit portion, and between the image display region and the second driving circuit portion.

7. A projection-type display device including the liquid crystal device according to claim 1, comprising:
   a light source portion that emits light supplied to the liquid crystal device; and
   a projection-type optical system that projects light modulated by the liquid crystal device.

8. A liquid crystal device comprising:
   an element substrate, provided with an image display region in which a plurality of pixel electrodes are arranged, at one surface side, the element substrate has a first side, a second side intersecting the first side, and a third side opposed to the first side and intersecting the second side;
   an opposing substrate provided with a common electrode to which a common potential is applied;
   a sealing material that bonds the element substrate to the opposing substrate; and
   a liquid crystal layer which is held within a region surrounded by the sealing material between the element substrate and the opposing substrate,
   wherein the one surface side of the element substrate is provided with
   a plurality of terminals, provided between the image display region and the first side, the plurality of terminals are provided along the first side,
   a driving circuit portion provided between the image display region and the second side,
   a common line, extending from the first side toward the third side between the second driving circuit portion and the second side, which supplies the common potential,
   an electrical supply line, extending along the second side between the driving circuit portion and the common line, which supplies a trapping potential that is different from the common potential, and
   an electrode that is electrically connected to the electrical supply line in a region interposed between the image display region and the sealing material.

9. The liquid crystal device according to claim 1, wherein the electrical supply line extends from the first side toward the third side between the second driving circuit portion and the sealing material.

10. The liquid crystal device according to claim 1, wherein the common line is electrically connected to an electrical supply terminal of the plurality of terminals to which the common potential is supplied.

\* \* \* \* \*